(12) United States Patent
Andrei

(10) Patent No.: US 7,882,100 B2
(45) Date of Patent: Feb. 1, 2011

(54) DATABASE SYSTEM WITH METHODOLOGY FOR GENERATING BUSHY NESTED LOOP JOIN TREES

(75) Inventor: Mihnea Andrei, Issy les Moulineaux (FR)

(73) Assignee: Sybase, Inc., Dublin, CA (US)

( * ) Notice: Subject to any disclaimer, the term of this patent is extended or adjusted under 35 U.S.C. 154(b) by 1774 days.

(21) Appl. No.: 10/905,861

(22) Filed: Jan. 24, 2005

(65) Prior Publication Data

US 2006/0167865 A1  Jul. 27, 2006

(51) Int. Cl.
*G06F 17/30* (2006.01)

(52) U.S. Cl. .......................... 707/714; 707/719; 707/797

(58) Field of Classification Search ................. 707/2–3, 707/10, 714, 719, 797; 709/201
See application file for complete search history.

(56) References Cited

U.S. PATENT DOCUMENTS

| | | | |
|---|---|---|---|
| 5,121,494 A | 6/1992 | Dias et al. | |
| 5,345,585 A | 9/1994 | Iyer et al. | |
| 5,412,804 A | 5/1995 | Krishna | |
| 5,412,806 A | 5/1995 | Du et al. | |
| 5,446,886 A | 8/1995 | Li | |
| 5,469,568 A | 11/1995 | Schiefer et al. | |
| 5,495,605 A | 2/1996 | Cadot | |
| 5,694,591 A | 12/1997 | Du et al. | |
| 5,758,335 A | 5/1998 | Gray | |
| 5,822,750 A | 10/1998 | Jou et al. | |
| 6,021,405 A | 2/2000 | Celis et al. | |
| 6,421,663 B1 | 7/2002 | Chen et al. | |
| 6,665,663 B2 * | 12/2003 | Lindsay et al. | 707/4 |
| 6,757,670 B1 | 6/2004 | Inohara et al. | |
| 6,807,546 B2 | 10/2004 | Young-Lai | |
| 6,996,557 B1 | 2/2006 | Leung et al. | |
| 7,076,477 B2 | 7/2006 | Lin et al. | |
| 7,139,749 B2 | 11/2006 | Bossman et al. | |
| 7,171,398 B2 | 1/2007 | Bestgen et al. | |
| 7,184,998 B2 | 2/2007 | Nica | |
| 7,523,462 B1 * | 4/2009 | Nesamoney et al. | 719/318 |
| 2004/0006561 A1 * | 1/2004 | Nica | 707/3 |
| 2004/0220923 A1 | 11/2004 | Nica | |

OTHER PUBLICATIONS

Andrei et al., Proceedings of the 27th VLDB Conference, Roma, Italy, 2001, pp. 1-10.*
Leonard D. Shapiro, David Maier, Paul Benninghoff, Keith Billings, Yubo Fan, Kavita Hatwal, Quan Wang, Yu Zhang, Hsiao min Wu, and Bennet Vance. Exploiting upper and lower bounds in top-down query optimization. In Proceedings of Ideas '01, pp. 20-33, 2001.*

(Continued)

*Primary Examiner*—Cheyne D Ly
(74) *Attorney, Agent, or Firm*—John A. Smart; G. Mack Riddle

(57) ABSTRACT

A database system with methodology for generating bushy nested loop join trees is described. In one embodiment, for example, an improved method is described for optimization of a query requesting data from a database, the method comprises steps of: generating a left deep operator tree for returning data requested by the query based on traversing a left deep operator tree search space; transforming the left deep operator tree into a semantically correct structure for returning data requested by the query; and building a query execution plan for returning data requested by the query based on the semantically correct structure.

52 Claims, 13 Drawing Sheets

OTHER PUBLICATIONS

Kremer et al. A Survey of Query Optimization in Parallel Databases, York University, Nov. 1, 1999, pp. 1-29.*
Von, V., Algeraic Query Optimization in Database Systems, Universitate Mannheim, 1999, pp. 1-139.*
McKenna, W. J., Efficient Search in Extensible database query optimization: The Volcano Optimizer Generator, University Microfiles International, 1993, pp. 1-152.*
Evrendilek et al., Distributed and Parallel Databases, 5, 77-114 (1997).*
Scheufele et al., PODS '97 Tucson Arizona, USA, 1997, pp. 238-248.*
Wilschut et al., SIGMOND '95, San Jose, CA USA, 1995, pp. 115-126.*
Steinebrunn, M. et al, Heuristic and Randomized Optimization for the Join Ordering Problem, VLDB Journal, vol. 6: 191-208, 1997.
Vance, B. et al, Rapid Bushy Join-Order Optimization with Cartesian Products, Proceedings of ACM SIGMOD Conference of Management of Data, pp. 35-46, Jun. 1996.
Cluet, S. et al, On the Complexity of Generating Optimal Left-Deep Processing Trees with Cross Products, Proceedings of the Fifth International Conference on Database Theory, pp. 54-67, Jan. 1995.
Galindo-Legaria, C., Uniformly-Distributed Random Generation of Join Orders, Proceedings of the International Conference on Database Theory, pp. 280-293, Jan. 1995.
Galindo-Legaria, C. et al, Fast, Randomized Join-order Selection—Why Use Transformations?, Proceedings of the International Conference on Very Large Data Bases, pp. 85-95, Sep. 1994.
Swami, A. et al, A Polynomial Time Algorithm for Optimizing Join Queries, Proceedings of the IEEE Conference of Data Engineering, pp. 345-354, Apr. 1993.
Ono, K. et al, Measuring the Complexity of Join Enumeration in Query Optimization, Proceedings of the 16th International Conference on Very Large Data Bases, pp. 314-325, Aug. 1990.
Ioannidis, Y.E. et al, Randomized Algorithms for Optimizing Large Join Queries, Proceedings of ACM SIGMOD Conference of Management of Data, pp. 312-321, Apr. 1990.
Swami, A., Optimization of Large Join Queries: Combining Heuristics and Combinatorial Techniques, Proceedings of ACM SIGMOD Conference of Management of Data, pp. 367-376, May 1989.
Swami, A. et al, Optimization of Large Join Queries, Proceedings of ACM SIGMOD Conference of Management of Data, pp. 8-17, May 1988.
Krishnamurthy, R. et al, Optimization of Non-recursive Queries, Proceedings of the 12th International Conference on Very Large Data Bases, pp. 128-137, Aug. 1986.
Ibaraki, T. et al, On the Optimal Nesting Order for Computing N-Relational Joins, ACM Transaction on Database Systems, vol. 9: pp. 482-502, Sep. 1984.
Selinger, P.G. et al, Access Path Selection in a Relational Database Management System, Proceedings of ACM SIGMOD Conference of Management of Data, pp. 23-34, May 1979.
Wong, E. et al, Decomposition—a Strategy for Query Processing, ACM Transaction on Database Systems, 1(3): pp. 223-241, Sep. 1976.

* cited by examiner

DATABASE SYSTEM WITH METHODOLOGY FOR GENERATING BUSHY NESTED LOOP JOIN TREES

CROSS REFERENCE TO RELATED APPLICATIONS

The present application is related to the following commonly-owned, presently-pending application(s): application Ser. No. 10/711,931, filed Oct. 13, 2004, entitled "Database System with Methodology for Parallel Schedule Generation in a Query Optimizer". The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 16122 Bytes, created: Jan. 24, 2005 9:09:54 AM; Object ID: File No. 1; Object Contents: Source code.

BACKGROUND OF INVENTION

1. Field of the Invention

The present invention relates generally to data processing environments and, more particularly, to a database system with methodology for generating bushy nested loop join trees.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Part I (especially Chapters 1-4), Addison-Wesley, 2000.

One purpose of a database system is to answer queries requesting information from the database. A query may be defined as a logical expression over the data and the data relationships set forth in the database, and results in the identification of a subset of the database. Consider, for instance, the execution of a request for information from a relational DBMS. In operation, this request is typically issued by a client system as one or more Structured Query Language or "SQL" queries for retrieving particular data from database tables on a server. The syntax of SQL is well documented, see e.g., "Information Technology—Database languages—SQL", published by the American National Standards Institute as American National Standard ANSI/ISO/IEC 9075: 1992, the disclosure of which is hereby incorporated by reference.

SQL queries express what results are requested but do not state how the results should be obtained. In other words, the query itself does not tell how the query should be evaluated by the DBMS. Rather, a component of the DBMS called the optimizer determines the "plan" or the best method of accessing the data to implement the SQL query. The query optimizer is responsible for transforming an SQL request into an access plan composed of specific implementations of the algebraic operator selection, projection, join, and so forth. The role of a query optimizer in a relational DBMS system is to find an adequate execution plan from a search space of many semantically equivalent alternatives.

Modern query processing relies on the theoretical basis of any RDBMS: relational algebras. The query execution plan of a query is an implementation of the relational algebra expression that describes that query. For instance, consider the following query:

SELECT r.a, SUM (s.a) FROM r, s

WHERE r.b=s.b AND r.c=0

GROUP BY r.a

The above query can be described by the following canonic relational expression:

```
(group <r.a; sum(s.a)>
    (filter < r.b = s.b and r.c = 0 >
        (join <true>
            r
            s
        )
    )
)
```

Optimization is the process of finding the best query execution plan (QEP) with the same semantics (i.e., result) as the SQL query. This can be formalized as the search for the best physical relational expression that is equivalent to the canonic relational expression of the SQL query. The above expression is called "canonic" as it is based on the SQL standard that specifies the semantics of declarative SQL queries by functional means: it gives the combination of relational operations that produce the outcome of the query. The optimizer typically uses logical operators for the canonic relational representation of the query. The logical operators are called "logical" as they refer to pure mathematical concepts: there is no assumption about the algorithm that would implement a logical operator, nor about the representation of a derived table.

The optimizer than builds physical operator plans or plan fragments which are semantically equivalent to the canonic relational expression, and compares the estimated costs of alternative plans or plan fragments. The physical operators are called "physical" as they correspond to the algorithms and data structures implemented by the execution engine of the database system. In general, several physical operators are associated with a given logical operator, as several algorithms implement a given algebraic relational operator. For instance, "join" is a common operation in an RDBMS. A database query may specify a "join" between two (binary join) or more (nary join) tables. Each table itself is composed of rows and columns. A join logical operator is implemented by NestedLoopJoin, MergeJoin, and HashJoin. The optimizer compares alternatives and finally retains the best physical plan that fully implements the query, with the best physical plan being selected based on estimated execution costs. For example, for a given query the optimizer may determine that it is most advantageous to implement a join logical operator using a NestedLoopJoin physical operator. Optimization and execution of queries involving joins have been extensively discussed in the literature. See, e.g., Selinger, Patricia G., et. al., "Access Path Selection in a Relational Database Management System," ACM SIGMOD Conference, pp. 23-34, 1979 which deals with finding optimal join orders and join methods to use. See, e.g., Shapiro, Leonard D., "Join Processing in Database Systems with Large Main Memories," TODS 11(3), pp. 239-264, 1986 and Graefe, Goetz, et. al., "Hash Joins and Hash Teams in Microsoft SQL Server," VLDB, pp. 86-97, 1998 which deal with merge joins and hash joins. See, e.g., Roussopoulos, Nick and Kang, Hyunchul, "Pipeline N-way Join Algorithm Based on the 2-way Semijoin" which deals with use of semi-join based approaches to process multijoin queries efficiently. See, e.g., Dewitt, David J., et. al., "Nested Loops Revisited," PDIS, pp. 230-242, 1993 which deals with parallelization of joins. The disclosures of the foregoing are hereby incorporated by reference. For further description of nested loop joins, see e.g., commonly-owned U.S. Pat. No. 6,493,701 by Ponnekanti, Nagavamsi titled "Database system with methodology providing faster N-ary nested loop joins", the disclosure of which is hereby incorporated by reference.

However, there are issues in implementing certain operators in current optimizers. Consider, for example, the following query:

SELECT * FROM r, s

WHERE r1=s1

The query execution plan for this query may be implemented with a NestedLoopJoin (NLJ) that has table r on the outer side and table s on the inner side. The NLJ would obtain each and every outer tuple in table r. For each outer tuple that qualifies, values in those columns are obtained. Next, for each outer tuple a full scan of the inner side (table s) is performed. If no index is available on the inner side, this may involve a line-by-line scan of each row of the inner table. If an index were available on the inner side, then instead of scanning every line, only the lines that are qualified by the index would be scanned. In either case, for each and every outer tuple, a scan is opened on the inner side to scan all of the tuples that qualify.

During a scan of table s, the outer tuple is stable (i.e., it is not changed or advanced during the scan on the inner side) and the current value of r1 is the same. Accordingly, a "pushdown" can be performed on the inner side by pushing down the value of the current tuple of r on the current inner side of s. This pushdown enables the value of the current tuple of r to be used in qualifying the tuples of s that have s1=r1. In other words, during the scan of s, the join clause that was s1=r1 becomes a search argument (s1=constant). This is the case because for the entire duration of the scan of s, r1 is constant.

One limitation of many current optimizers having a bottom-up search engine is that they can only perform a one-level pushdown. The inner side of a NLJ can include a scan of a table (either table scan or index scan), but implementation of more complex structures, such as a join, on the inner side is problematic in current optimizers, particularly if the optimizer employs a "bottom-up" search strategy.

Many optimizer search engines operate in a bottom-up fashion by incrementally building small plan fragments (e.g., single table scan, two table joins, three table joins, and so forth) starting with the leaves. The plans and permutations are generated bottom-up, the costs are estimated bottom-up, and properties (if any) are also propagated bottom-up. The optimizer thus gradually builds alternative total plans (i.e., plans that have the same semantics as the SQL query and are candidates to become the final query execution plan) and estimates their costs using a cost model. The optimizer typically keeps the partial plans in a cache which is referred to as the "plan cache".

In order to implement an inner bushy tree structure inside a NLJ, a bottom-up search engine would have to start incrementally building small plan fragments on the inner side. However, a problem in doing so is that when the small plan fragments are built on the inner side, the search engine does not yet know what the outer side will be. Typically, the outer side will be found later when that specific inner side is being put inside the NLJ. However, at the point the plan fragments are built on the inner side, the outer side that would do the pushdown is not yet known. Similarly, the predicates that would become search clauses as a result of the pushdown are also unknown. As the predicates are not yet known, costs also cannot be determined. The optimizer cannot determine a cost yet because it does not really know the behavior. This also means that the optimizer cannot have equivalence class competition as it cannot prune away plan fragments that are not promising (i.e., those with higher costs). As a result of these factors, attempting to do a deep pushdown on the inner side of a NLJ in current bottom-up search engines results in exponential complexity (both in space and in time) in terms of the number of plan fragments that are generated.

For these reasons, bottom-up search engines currently generate only simple leaves and not inner bushes on the inner side of a NestedLoopJoin. In contrast, a search engine can typically generate bushy trees for MergeJoin and HashJoin. To have bushy trees with a NLJ, the search engine typically must use a stored index or a multi-table reformatting. This means that it must store the results of an n-table subjoin in a work table that has an index which is then used inside a NLJ. This approach of building a stored index is an expensive operation as building the stored index and materializing a result set involves logical and physical I/O (input/output). The problem with an approach of generating only simple leaves on the inner side of a NLJ is that some queries (e.g., queries that have outer joins) do need, given the semantics of the query, a bushy tree structure on the inner side. In some cases, the best possible plan uses a NLJ and requires a bushy tree structure on the inner side.

One approach for generating a bushy tree in a NLJ is to pass local information in the plan. This involves telling a join node that given that the outer join did not generate any tuples, it is necessary to generate the null substitution tuple (or "phantom tuple"). This approach of passing local information in the plan is inconsistent with the use of a modern, operator spaced query plan in which each operator is independent of each other operator in the query plan. These operators are designed to be "plug and play" in that any operator can be put over (and under) any other operator in a plan. Accordingly, it would be desirable to use an approach that avoids use of the phantom tuple in a conceptually acceptable manner.

Another issue to be addressed is that when a bushy tree structure is required by the semantics of a query, generating this structure currently results in increased complexity of the search space. In general, bushy trees utilize more memory than left deep trees in the plan cache. In the case of a database installation in which memory is limited, it would be advantageous to generate a bushy tree structure without increasing the space usage of the plan cache.

What is needed is a method for building a bushy tree inside a NLJ in an optimizer that uses a bottom-up search strategy. The solution should build a bushy NLJ tree that correctly captures the semantics of the query while avoiding the expense of building a stored index. Ideally, the solution should also be implemented in a manner which does not require an increase in space utilization during query optimization. The present invention provides a solution for these and other needs.

SUMMARY OF INVENTION

A database system with methodology for generating bushy nested loop join trees is described. In one embodiment, for example, an improved method of the present invention is described for optimization of a query requesting data from a database, the method comprises steps of: generating a left deep operator tree for returning data requested by the query based on traversing a left deep operator tree search space; transforming the left deep operator tree into a semantically correct structure for returning data requested by the query; and building a query execution plan for returning data requested by the query based on the semantically correct structure.

In another embodiment, for example, a system of the present invention for optimization of a query requesting data from a database is described that comprises: a search engine for building a left deep operator tree for returning data requested by the query based on traversing a left deep operator tree search space; a transform module for transforming the left deep operator tree into a semantically correct tree structure; and a generator module for generating a query execution plan for returning data requested by the query based on the semantically correct tree structure.

In yet another embodiment, for example, in a database system, a method of the present invention is described for optimization of a query, the method comprises steps of: generating a plurality of candidate subplans for executing the query, with at least some of the candidate subplans structured as left deep nested loop join subtrees; building a plan for executing the query based on selecting candidate subplans having favorable execution costs; determining whether any left deep nested loop join subtree of the plan should be transformed to a bushy tree shape; creating a transformed plan by transforming any left deep nested loop join subtrees determined to need transformation to a bushy tree shape; and constructing a query execution plan for executing the query based on the transformed plan.

In another embodiment, for example, a system of the present invention for optimization of a query requesting data from a database is described that comprises: a search engine for traversing a left deep operator tree search space and generating a left deep operator tree plan for returning data requested by the query; a transform module for transforming the left deep operator tree into a bushy tree structure; and a code generator for generating a query execution plan for returning data requested by the query based on the bushy tree structure.

DETAILED DESCRIPTION

Glossary

Figure 1:
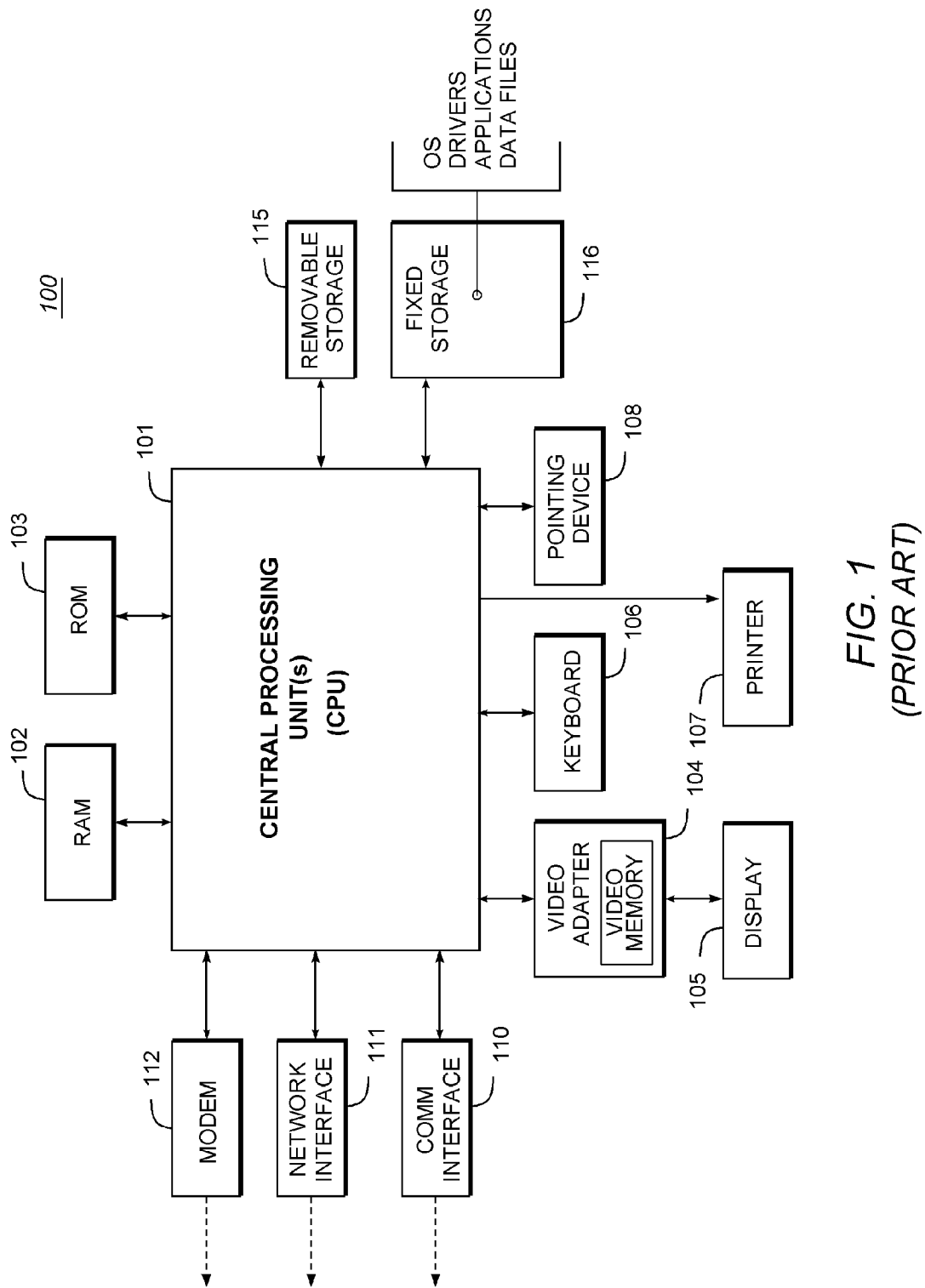
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Bottom-up search strategy: A bottom-up search strategy is a type of search strategy where optimal query plans are generated from optimal subplans in a bottom-up fashion. The plans and permutations are generated bottom-up. Also, the costs are estimated bottom-up and properties (if any) are propagated bottom-up.

Bushy tree plan: A bushy tree plan is a query plan in which some join operations have two or more direct children that are also join operations. Non-bushy plans are typically referred to as left deep trees (in which the right child is a scan operator) or a join list in which tables are joined in linear order. For further description of a bushy tree search space, see e.g., Vance, B. et al "Rapid Bushy Join—Order Optimization with Cartesian Products", in Proceedings of ACM SIGMOD Conference of Management of Data, pp 35-46, June 1996, the disclosure of which is hereby incorporated by reference.

Core optimizer: The core optimizer is a component of the present invention that generates a set of optimal query plans (or subplans) that are then analyzed to select the best plan (i.e., the plan or subplan having most favorable (i.e., lowest) execution costs).

Cost based pruning: Cost based pruning is a type of pruning technique where portions of a search space (tree shapes, permutations, access methods) are skipped purely based on cost estimates applicable to a query.

Derived table: A derived table is the result set of a relational operator.

Directed acyclic graph: A directed graph is a graph whose edges are ordered pairs of vertices (nodes). Each edge of a directed graph can be followed from one node (vertex) to the next. A directed acyclic graph is a directed graph where no path starts and ends at the same node.

Equivalence class: An equivalence class is a grouping of plans or subplans covering the same tables of a database. The characteristics of an equivalence class are that an equivalence class is identified by its set of underlying tables and that its candidate plans (or subplans) compete with each other to be part of the best total plan. For example, a sub-plan joining tables A and B is in a different equivalence class than a subplan joining tables B and C. The plan cache contains the set of created equivalence classes (Eqcs).

Enforcer: The enforcer nodes (operators) used in the currently preferred embodiment of the present invention generate properties such as ordering, partitioning, and the like. At each node in a search graph all useful properties are made available either through eager enforcement by explicitly applying the enforcer or by derivation from child nodes. In prior database server systems properties were obtained by explicitly enforcing them, in some cases unnecessarily, when available as side-products of child operators.

Equivalence class: An equivalence class describes the set of subplans that combine a given sub-set of generic tables. The equivalence class also contains the logical properties of those subplans.

Execution engine operators: The execution module of the currently preferred embodiment of the present invention represents the query plan as a tree of operators (similar to the optimizer's physical plan-tree). These operators are referred to herein as execution engine operators or Lava engine operators (LeOp).

Existence scan: An existence scan is based on stopping the scan of an existence table as soon as a tuple was fully qualified at the top level, when each existence table is placed only after all non-existence tables correlated to it. It is typically introduced by tables from a flattened EXISTS subquery.

Generic table: A generic table normally refers to a table referenced in a query, but also is a convenient abstraction to represent any object that is permutated in the join order by the optimizer. For example, a subquery can be modeled as a generic table.

In-order join: An in-order join is a join operation where some (or all) of the joining attributes from the outer are ordered, as would occur from a sort or index scan.

Iterator: In the currently preferred embodiment of the present invention, query results are encapsulated using iterators, which are self-contained software objects that accept a stream of rows from null or n-ary data sets. The role of an iterator is to process many iterations of a data set across many nodes in serial or parallel. For each iteration of a data set, the iterator applies a predefined behavior to the data set being processed, manipulating the data according to the specification of that iterator. For example, scanning rows from a table on disk can be the behavior of one type of iterator. A key feature of iterators is that regardless of what type the iterator is and what behavior is associated with it, all iterators follow the same mode and have the same external interface. They all open data streams, iteratively read the streams, process it and close the streams.

Left deep tree plan: A left deep tree plan is a type of query plan structure in which right nodes are always leaf nodes. Left-deep trees are desirable because they reduce the need to materialize intermediate results and for several types of join implementations they result in more efficient execution plans. For further description of left deep processing trees, see e.g., Cluet, S. et al "On the Complexity of Generating Optimal Left-Deep Processing Trees with Cross Products", in Proceedings of the Fifth International Conference on Database Theory, pp 54-67, January 1995, the disclosure of which is hereby incorporated by reference.

Logical operator: A logical operator (LOP) is a relational algebra operator that is not associated or tied to a specific algorithm or implementation. "Scan" and "join" are examples of logical operators.

Logical property: A logical property is a property that is common to a set of subplans associated with a set of tables (equivalence class). An example would be the "row count" since no matter how the set of tables are joined the same row should exist after the same predicates are applied.

Multi-way joins: Multi-way joins consist of join queries in which some tables join to two or more tables resulting in star join and snow flake join configurations.

Operators: The query processing (QP) modules of the system of the present invention break down relational queries into relational operators. Relational operators are represented as nodes in the query plan trees. The query plans are transformed (e.g., into logical operators, physical operators, and execution engine operators) while passing through different query processing modules: prep (preprocessing) phase, core optimizer, code generator, and execution engine.

Ordering: Ordering refers to a specific sequence (ascending or descending) of attributes in a result set as would occur from an index scan or a sort.

Physical operator: A physical operator is an algorithm implementing a logical operator (e.g., scan, sort-merge join, nested loop join, and so forth).

Physical property: A physical property (or POP) is a property that is associated with a physical operator and depends on the actual algorithm implemented by that operator and on the physical properties of its children (hence, recursively, on the physical operators in the subplan). For example, the ordering (from an index scan or sort) of the outer child is usually inherited after subsequent join operators are evaluated, but each plan in an equivalence class has potentially different orderings depending on the underlying operators used in the subplan POP.

Physical query plan: Physical operator trees are the end products of the core optimizer of the present invention.

Plan cache: A plan cache stores useful partial plans (plan fragments or subplans) that may be necessary in future construction of complete plans.

Projection: The set of attributes available on the output of an operator. This implies a minimal set of attributes in which each attribute is needed by some parent of the respective operator.

Property model: The optimizer of the present invention includes a property model designed to represent efficiently combinations of orderings so that maximal use is made of any ordering available from an index scan or a sort node. Partitioning is another property that is modeled in the optimizer of the present invention.

Pruning: Pruning is a technique of search space control in which only promising subplans are retained (i.e., the ones that could be part of the best total plan). In the currently preferred embodiment of the present invention, the optimizer uses cost based pruning and heuristics based pruning.

Query execution plan or QEP: A query execution plan or QEP is a data structure that is interpreted by the relational database management system's execution module or engine. In the currently preferred embodiment of the present invention, a QEP is a tree of relational algorithms applied to input tuple streams. A (logical level) relational expression is composed of (logical level) relational operators; it is a tree of logical nodes. A QEP or plan is composed of physical level relational operators (or algorithms); it is a tree of physical nodes. These physical operators are nodes in a tree that have children. A tree of physical operators is a subplan or the full (final) plan. A plan is the full plan if it covers the total semantics of the query (i.e., if the result set of the root node of the plan tree delivers the result set of the query).

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. The standard user and application program interface to a relational database is the Structured Query Language (SQL), defined below.

Scalar: Scalar is a term for an SQL expression that produces a single value (i.e., not a set of values).

Search criteria: A user specified or system determined criteria used to influence optimization techniques used to generate plans.

Search engine: The search engine refers to a component of the query optimizer of the present invention that generates and evaluates alternative execution plans. The search engine includes as three components: search criteria, search space, and search strategy. The search engine constitutes a major component of the core optimizer.

Search space: Search space refers to the exhaustive set of plans considered for selection by the search engine.

Semi-join: A semi-join is a valid relational version of the existence scan that does not rely on non-local information. Typically these are introduced by flattening of EXISTS subqueries.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5) 1999), the disclosure of which is hereby incorporated by reference.

Stored table: A fully materialized table, stored tables are either of persistent base tables, transient worktables, or table value constructors.

Subplan or plan fragment: A subplan or plan fragment is a tree of physical operators that is a portion of a (full) query execution plan (as defined above) or a candidate to become a portion of a (full) query execution plan.

Top down search engine: An approach to evaluating plans in the optimizer search space in which a parent operator is evaluated prior to evaluating the respective child operators.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic).

The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56 K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like.

Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
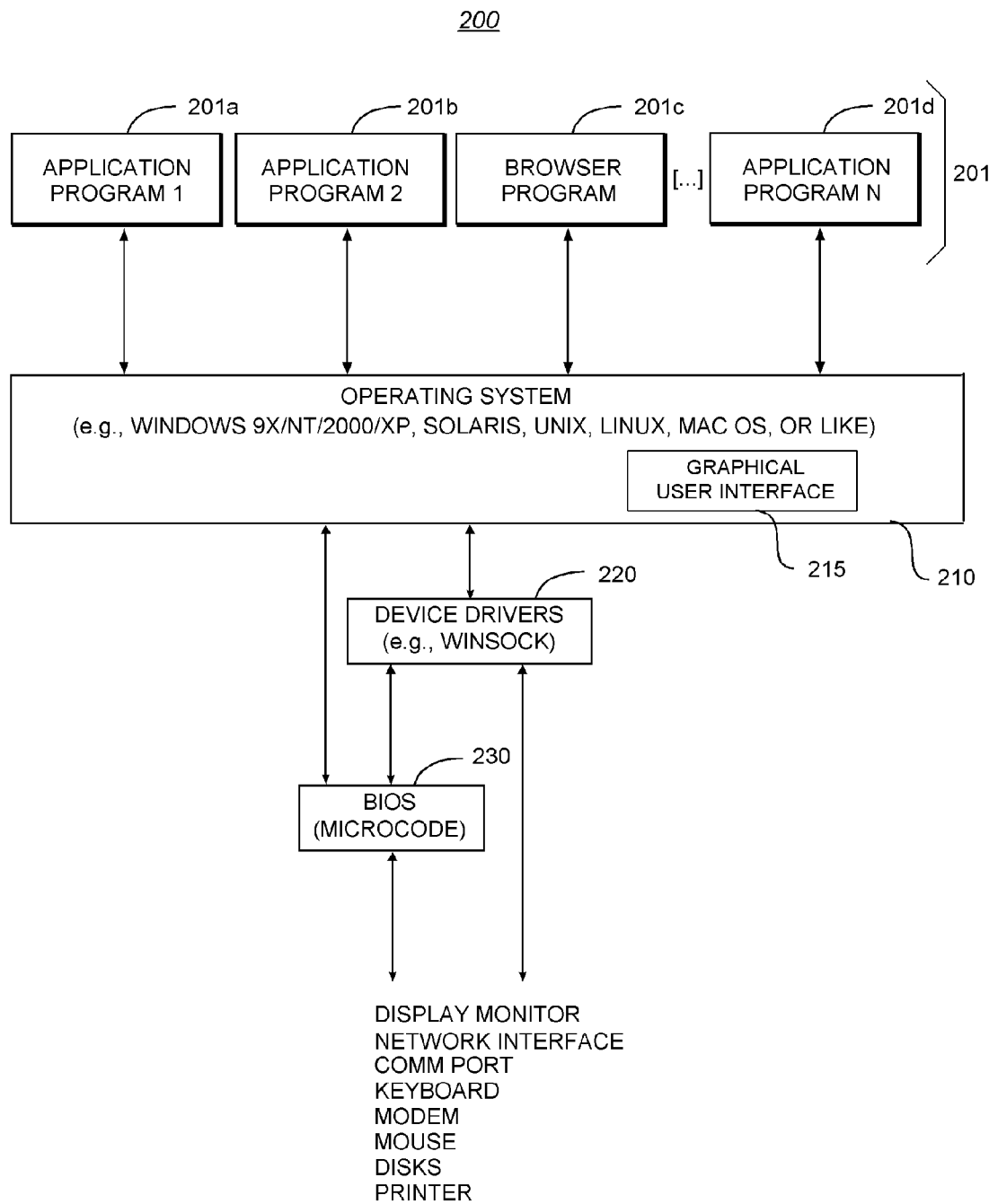
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable processor-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

Client-Server Database Management System

Figure 3:
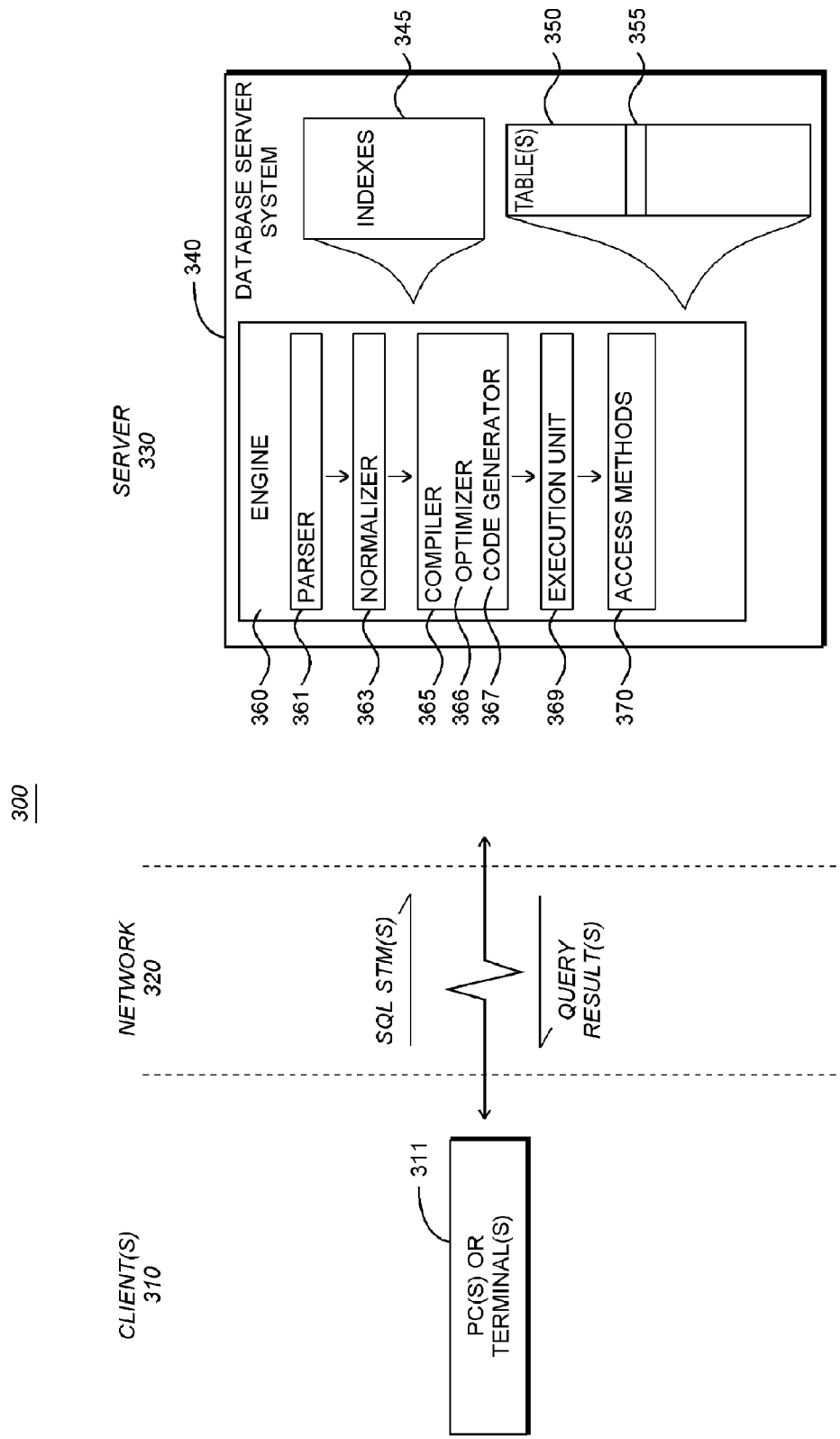
FIG. 3 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 3 illustrates the general structure of a client/server database system 300 suitable for implementing the present invention. As shown, the system 300 comprises one or more client(s) 310 connected to a server 330 via a network 320. Specifically, the client(s) 310 comprise one or more standalone terminals 311 connected to a database server system 340 using a conventional network. In an exemplary embodiment, the terminals 311 may themselves comprise a plurality of standalone workstations, dumb terminals, or the like, or comprise personal computers (PCs) such as the above-described system 100. Typically, such units would operate under a client operating system, such as a Microsoft (registered trademark) Windows client operating system (e.g., Microsoft (registered trademark) Windows 95/98, Windows 2000, or Windows XP).

The database server system 340, which comprises Sybase (registered trademark) Adaptive Server (registered trademark) Enterprise (available from Sybase, Inc. of Dublin, Calif.) in an exemplary embodiment, generally operates as an independent process (i.e., independently of the clients), running under a server operating system such as Microsoft (registered trademark) Windows NT, Windows 2000, or Windows XP (all from Microsoft Corporation of Redmond, Wash.), UNIX (Novell), Solaris (Sun), or Linux (Red Hat). The network 320 may be any one of a number of conventional network systems, including a Local Area Network (LAN) or Wide Area Network (WAN), as is known in the art (e.g., using Ethernet, IBM Token Ring, or the like). The network 320 includes functionality for packaging client calls in the well-known Structured Query Language (SQL) together with any parameter information into a format (of one or more packets) suitable for transmission to the database server system 340.

Client/server environments, database servers, and networks are well documented in the technical, trade, and patent literature. For a discussion of Sybase-branded database servers and client/server environments generally, see, e.g., Nath, A., "The Guide to SQL Server", Second Edition, Addison-Wesley Publishing Company, 1995. For a description of Sybase (registered trademark) Adaptive Server (registered trademark) Enterprise, see, e.g., "Adaptive Server Enterprise 12.5.1 Collection: (1) Core Documentation Set and (2) Installation and Configuration," available from Sybase, Inc. of Dublin, Calif. This product documentation is available via the Internet (e.g., currently at sybooks.sybase.com/as.html). The disclosures of the foregoing are hereby incorporated by reference.

In operation, the client(s) 310 store data in, or retrieve data from, one or more database tables 350, as shown at FIG. 3. Data in a relational database is stored as a series of tables, also called relations. Typically resident on the server 330, each table itself comprises one or more "rows" or "records" (tuples) (e.g., row 355 as shown at FIG. 3). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 310 issue one or more SQL commands to the server 330. SQL commands may specify, for instance, a query for retrieving particular data (i.e., data records meeting the query condition) from the database table(s) 350. In addition to retrieving the data from database server table(s) 350, the clients 310 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 310 (via network 320) are processed by the engine 360 of the database server system 340. The engine 360 itself comprises a parser 361, a normalizer 363, a compiler 365, an execution unit 369, and an access methods 370. Specifically, the SQL statements are passed to the parser 361 which converts the statements into a query tree—a binary tree data structure which represents the components of the query in a format selected for the convenience of the system. In this regard, the parser 361 employs conventional parsing methodology (e.g., recursive descent parsing).

The query tree is normalized by the normalizer 363. Normalization includes, for example, the elimination of redundant data. Additionally, the normalizer 363 performs error checking, such as confirming that table names and column names which appear in the query are valid (e.g., are available and belong together). Finally, the normalizer 363 can also look-up any referential integrity constraints which exist and add those to the query.

After normalization, the query tree is passed to the compiler 365, which includes an optimizer 366 and a code generator 367. The optimizer 366 is responsible for optimizing the query tree. The optimizer 366 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 367 translates the query execution plan selected by the query optimizer 366 into executable form for execution by the execution unit 369 using the access methods 370.

All data in a typical relational database system is stored in pages on a secondary storage device, usually a hard disk. Typically, these pages may range in size from 1 Kb to 32 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

For enhancing the storage, retrieval, and processing of data records, the server 330 maintains one or more database indexes 345 on the database tables 350. Indexes 345 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter 'A'.

The above-described computer hardware and software are presented for purposes of illustrating the basic underlying desktop and server computer components that may be employed for implementing the present invention. For purposes of discussion, the following description will present examples in which it will be assumed that there exists one or more "servers" (e.g., database servers) that communicates with one or more "clients" (e.g., personal computers such as the above-described system 100). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview of Search Space Generation of Bushy Nested Loop Join Trees

The present invention comprises a system providing methodology for building a bushy tree inside a nested loop join (NLJ) in a bottom-up query optimizer. The present invention provides the capability for building a bushy NLJ tree that correctly captures the semantics of a query, while providing good performance and not requiring an increase in space utilization.

The general approach of the present invention provides for the search engine of the query optimizer to generate only left deep nested loop join trees. The search engine of the currently preferred embodiment of the present invention builds plans in a bottom-up fashion starting with the leaves (the scan algorithms). The optimizer's search engine traverses a search space: building and reordering logical expressions using algebraic rules (associativity, commutativity, etc.); replacing the logical operators with the physical ones that implement them; and enforcing the properties needed by some algorithms. It gradually builds alternative total plans (i.e., plans that have the same semantics as the SQL query and are candidates to become the final query execution plan) and estimates their costs using a cost model. It compares the costs of alternative plans and prunes unfavorable plans. During the optimization process it keeps the partial plans in a plan cache.

Currently, the search engine generates only left deep nested loop join trees during this phase of query optimization. This approach enables unfavorable plans to be pruned while also avoiding an increase in search space complexity (and space utilization). One or more candidate query execution plans that are generated by the search engine may include a NLJ. In some cases a NLJ that needs to have an inner bush (i.e., is semantically incorrect without an inner bush) might be the best plan found by the search engine.

When the query contains right nested outer joins, implementation of the outer join semantics using an outer join operator in the query plan may require the production of bushy trees. The present invention provides methodology for generating semantically correct bushy trees after the search engine has produced a left deep tree. The present invention provides for taking the left deep tree as the basis for a transformation that generates a semantically correct bushy tree shape over the leaves (leafs) of the left deep nested loop join tree generated by the search engine.

The bushy tree that is generated as a result of this transformation has the same cost as the left deep tree. As a consequence, if the optimizer has chosen a left deep tree as a favorable plan, the transformed tree is still favorable as it has the same cost estimate as the left deep tree. This cost equivalence is an important aspect of the present invention as it enables the optimizer to select a left deep shape that is semantically incorrect as the best plan and then apply a transformation to generate a semantically correct version of this plan.

System Components

Search Engine

Figure 4:
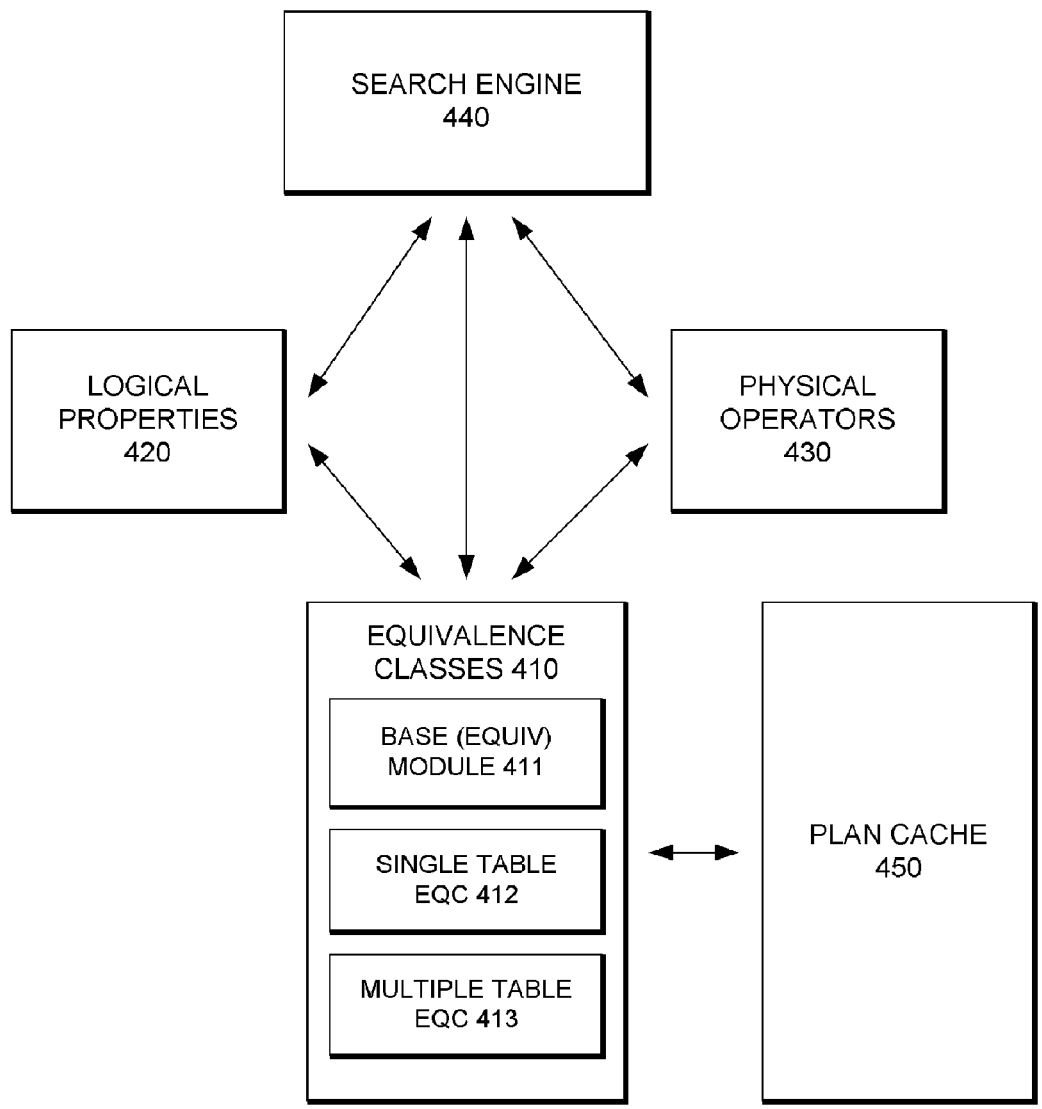
FIG. 4 is a high-level block diagram illustrating components of an optimizer with which the present invention may be preferably implemented.

Before describing the present invention in more detail, an optimizer in which the present invention may be implemented will be described. FIG. 4 is a high-level block diagram illustrating components of an optimizer 400 with which the present invention may be preferably implemented. As shown, the optimizer includes equivalence classes 410, a logical properties module 420, a physical operators module 430, a search engine 440, and a plan cache 450. The plan cache 450 stores equivalence classes created for a query.

The equivalence classes 410 is a data structure that describes a set of subplans. Each of the subplans in the same equivalence class references the same set of underlying database tables. For instance, two subplans joining the same two tables are in the same equivalence class. Each subplan in an equivalence class competes with other subplans in the same equivalence class to be part of the total (final) plan generated by the optimizer. In the currently preferred embodiment, the equivalence classes 410 include a base (or equiv) module 411, a single table Eqc (Eqc1) module 412, and a multiple table Eqc (Eqcn) module 413. Single table Eqc module 412 contains plans over a single table (such as index scans or table scans and the enforcers of those scans of the table). The multiple table Eqc 413 holds subplans joining together a plurality of tables. Subplans retained in multiple table Eqc module 413 would typically have a join node or an enforcer at the root node (e.g., a sort operator).

The logical properties module 420 includes a set of logical operators which describe (a priori) the common behavior of a set of subplans that refer to these operators. Before enumerating a subplan or plan fragment, several characteristics of the subplan can be determined from examination of the equivalence class containing the subplan. One of the characteristics of subplans in the plan cache 450 that can be determined in advance is the set of underlying tables referenced by the subplans. Because an equivalence class is characterized by an underlying set of tables, these tables are trivially known for all of the subplans in each equivalence class. In addition, the available columns (or attributes) are known. The available columns can be determined as the union of all of the columns of all of the underlying tables. The logical properties can be also computed (determined) before subplan enumeration. This allows subplan enumeration to be based upon the available, computed logical properties.

Unlike the logical properties, the physical properties are specific to a given plan—a given physical implementation of a plan fragment or subplan. For instance, whether or not an ordering is available in the result of a physical operator depends upon whether the physical plan has a sort or an index scan providing an ordering, and whether the ordering is retained (i.e., not lost). In other words the physical properties are only known for a given plan or subplan once it has been built.

The physical operators module 430 describes the hierarchy of each of the physical operators. The physical operators module implements optimization time physical operators that are used for optimization. The optimization time physical operators that are used for optimization of the query do not, however, actually produce data. Instead, these optimization time physical operators describe or simulate Lava (execution) operators. The physical operators describe the execution cost of their associated Lava operator on some given input. They also describe physical level properties of their argument and result derived tables, which model the Lava streams of tuples, including whether they are ordered on any column, whether they are partitioned, and so forth. The physical operators module 430 contains optimization time descriptions which are used for evaluation and costing during the optimization process. These physical operators are structured as nodes in a tree that have children. A tree of physical operators is a subplan or the full (final) plan. A plan is the full plan if it covers the total semantics of the query (i.e., if the result set of the root node of the plan tree delivers the result set of the query).

In the currently preferred embodiment, the optimization time nodes and the query execution time nodes are implemented using two different types of data structures. Different data structures are used because of differing needs during query optimization and query execution. In addition, the number of nodes in the final query execution tree is typically much smaller than the number of nodes that must be examined during optimization. Accordingly, it is advantageous to have the smallest possible operators (nodes) during the optimization process.

The search engine module 440 inspects a search space of possible plans and plan fragments (or subplans) in order to determine the most cost-effective query execution plan for execution of a given query. The search engine module receives as input a logical operator tree consisting of a tree of logical relational operators. The search engine 440 generates a physical operator tree as output. The physical operator tree that is generated is the best plan determined based upon the optimizer's cost model and the area of the search space inspected by the search engine. This best plan may then be used by the code generator (not shown at FIG. 4) to generate the execution plan for execution of the query against the database.

The present invention may also be implemented in conjunction with either a serial optimizer or a parallel optimizer. A parallel optimizer which is suitable for use in conjunction with the present invention is described in commonly-owned, co-pending U.S. patent application Ser. No. 10/711,931 titled "Database System with Methodology for Parallel Schedule Generation in Query Optimizer". In the event of an implementation including a parallel optimizer, the search engine may generate a plurality of candidate best plans which are provided to a parallel scheduler. The parallel scheduler then generates a schedule for each of the candidate plans and estimates the costs of each scheduled plan. The candidate plan having the most favorable execution costs is then selected and used as the basis for generating the execution plan for execution of the query.

It should be noted that the query execution plan generated by the optimizer is a tree of iterators (sometimes also referred to herein as Lava operators). These iterators produce their result derived table one tuple at a time by applying their algorithm to tuples that they receive from their children. These iterators are self-contained software objects that accept a stream of rows from one, two, or multiple data sources. The role of an iterator is to process many iterations of a data set across many nodes in serial or parallel. Iterators do not know what the source of a data stream is; whether it is the contents of a disk file, a network connection, or even another iterator. For each iteration of a data set, the iterator applies a pre-defined behavior to the data set being processed, manipulating the data according to the specification of that iterator. For example, scanning database rows from a database on disk can be the behavior of one type of iterator. By using iterators complex queries (e.g., such as the one shown in the above example) are structured by stringing together appropriate operators into a tree structure.

The search engine of the currently preferred embodiment of the present invention is a depth-first search engine. A breadth-first search engine starts by processing all of the one table equivalence classes, then proceeds to processing all of the two table equivalence classes, and so on. In contrast to the operations of a breadth-first search engine which exhaustively processes each level in the plan cache 450, the depth-first search engine of the currently preferred embodiment attempts to develop a full plan (i.e., a plan covering all tables) more rapidly. After evaluating the single table equivalence classes, the depth-first search engine combines two of these equivalence classes to enumerate a single two-table equivalence class. The depth-first search engine then immediately moves up a level in the plan cache by adding another single table equivalence class to the two-table equivalence class to generate a three-table equivalence class. In this manner, the depth-first search engine proceeds to try and develop a full plan before evaluating each and every combination at each level of the plan cache. After a full plan has been developed, the depth-first search engine then goes back and considers other alternative combinations that may result in a more efficient query execution plan.

Transformation of Plans to Generate Bushy NLJ Trees

Figure 5:
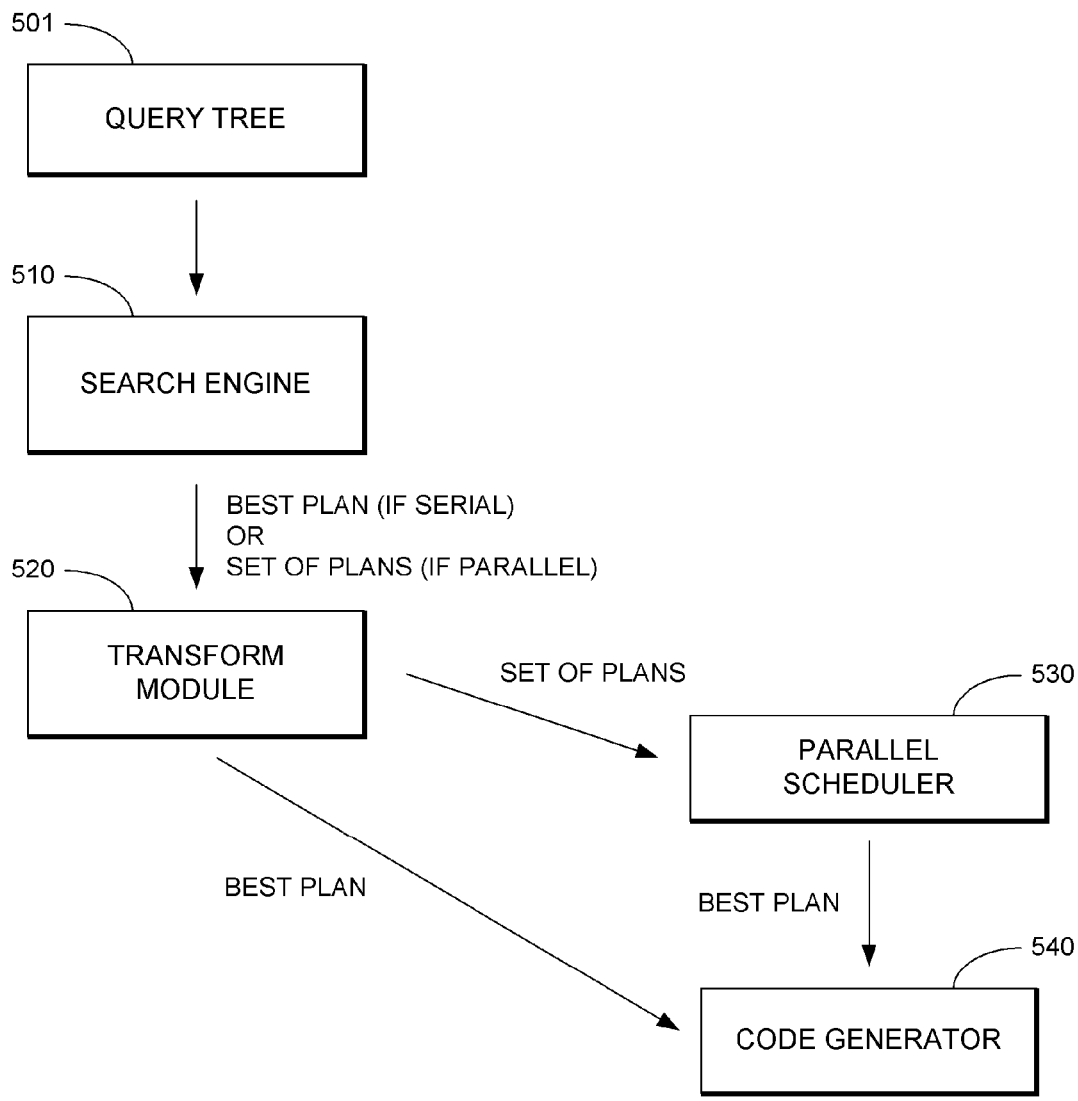
FIG. 5 is a high-level flow diagram illustrating the processing of a query in an optimizer constructed in accordance with the present invention.

The present invention, in its currently preferred embodiment, is implemented in the optimizer of a database system between the search engine component of the optimizer and the code generator. FIG. 5 is a high-level flow diagram illustrating the processing of a query in an optimizer constructed in accordance with the present invention.

A query received by the database system is parsed and normalized and is provided to the optimizer in the form of a query tree 501 as shown at FIG. 5. The search engine 510 traverses the search space generating and costing alternative plans for executing the query. The search engine 510 operates as described above to generate one or more favorable plan(s) for execution of the query. As illustrated at FIG. 5, in serial mode, the search engine outputs a single best plan, while the search engine of a parallel optimizer may output multiple plans which are candidates to become the best plan.

The transform module 520 implementing the methodology of the present invention examines the plan(s) output by the search engine 510 and performs any necessary transformation before code generation by the code generator 540. In the currently preferred embodiment of the present invention, the transform is performed as part of the search engine's post processing. The transform module 520 determines if a plan needs to be transformed because it is semantically incorrect (i.e., because a bushy shape is needed for an outer join having an inner side with more than one table). If so, a transformation is performed to generate a semantically correct bushy tree shape as hereinafter described.

The transform module 520 can be used in conjunction with either a serial optimizer or a parallel optimizer. In the case of serial optimization of a query, a single best plan is generated by the search engine. The transform is performed (if necessary) by the transform module 520 to generate a semantically correct bushy tree structure.

In the case of parallel optimization of a query, the search engine may output more than one plan as the costs may not be directly comparable in parallel mode (e.g., as the cost may comprise a vector of three components). If in parallel mode, the transform module 520 performs any necessary transformation of the set of plans output by the search engine and provides the transformed set of plans to the parallel scheduler 530 of the optimizer. The parallel scheduler 530 generates a schedule for each of the plans, estimates the cost of each scheduled plan, and selects the best plan. For example, the search engine 510 may select a total of eight plans which are candidates to become the (best) final plan and provide these eight plans to the transform module 520. After any necessary transformation is performed, these eight plans are provided to the parallel scheduler 530. In the currently preferred embodiment of the present invention, the bushy tree transform is performed as necessary for any of these plans requiring transformation before the plans are provided to the parallel scheduler 530. However, the transform could also be made after the parallel scheduler 530 selects a (best) final query execution plan, if desired.

In the case of both serial and parallel optimizers, the best plan that is determined is provided to the code generator 540 for generating the query execution plan for execution of the query. The code generator 540 generates the actual execution operators (e.g., Lava operators) for execution of the plan that has been selected.

Detailed Operation

The Outer Join Transform and Deep Pushdown Bushy Trees

As described above, the search engine of the currently preferred embodiment of the present invention generates left deep trees. A left deep tree of a plan generated by the search engine may include a nested loop join (NLJ) operator. The left deep tree includes table scans and/or index scans as leaves. Each of those table scans and index scans has a buffer cache behavior. In other words, open( ), next( ), and close( ) calls are performed in a given sequence. The sequence of those calls indicates what database pages are in the cache and actually give the pattern of logical I/Os and physical I/Os (which are the most costly operations).

The transform of the present invention provides for retaining the leaves in the same order, while replacing the left deep tree above the leaves with another tree shape. Assume, for purposes of this discussion, that the tree shape could be bushy, right deep, or another tree form that joins all of the leaves. The transformation may result in the intermediate nodes (i.e., the join nodes) being in a different order. However, the leaves that are affected by (or involved in) the transformation remain in the same order. Thus, the sequence of logical I/Os and physical I/Os will remain the same after the transformation. This does not mean that a left deep tree and a right deep tree will have exactly the same performance when a query execution plan is actually executed. However, given the components of the optimizer's cost model, namely logical I/O and physical I/O, at optimization time there would not be any cost difference between the left deep tree and the (transformed) tree.

This may be illustrated by an example involving a left deep tree and a (transformed) right deep tree. Consider, for example, the following query:

1: Select * from r

2: left join (s left join t on s1=t1)

3: on r2=s2

Figure 6A:
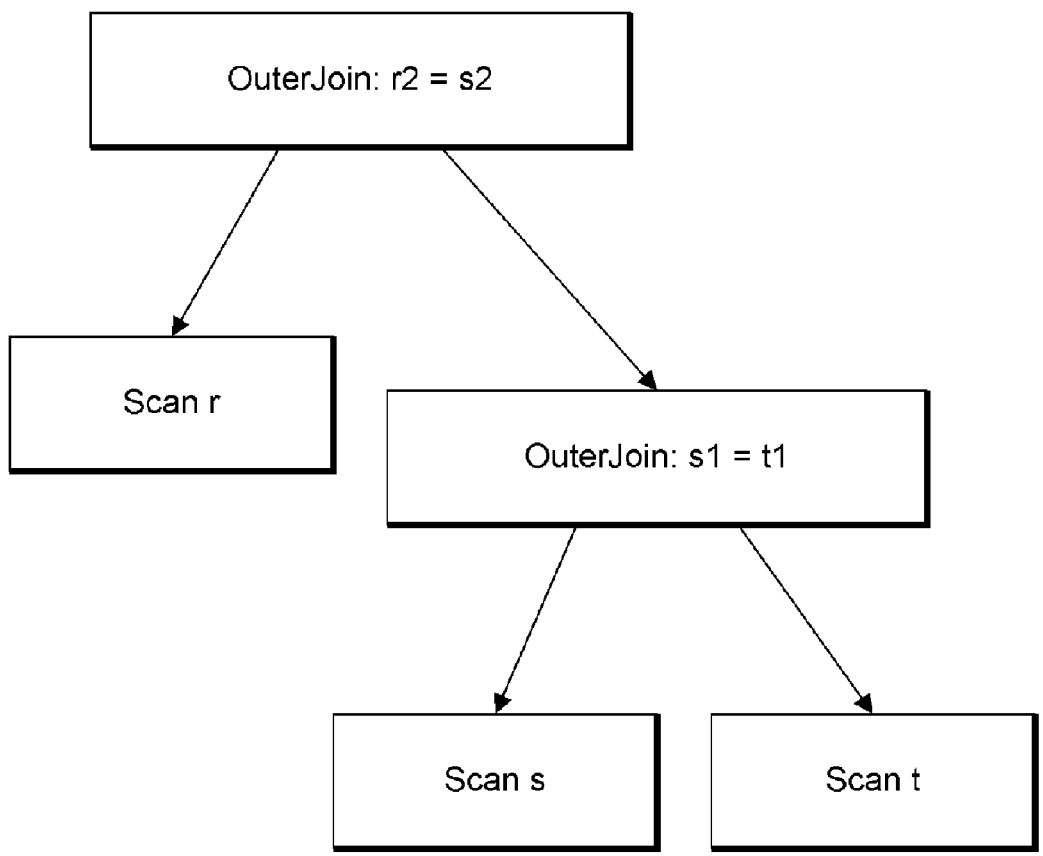
FIG. 6A is a block diagram illustrating a plan with a bushy inner branch.

The implementation of bushy outer join (OJ) expressions (right nested) requires the use of a bushy tree with a bushy inner branch. FIG. 6A is a block diagram illustrating a plan 610 with a bushy inner branch which is need in order to comply with the NULL substitution semantics. The fact that plan 610 has a bushy inner branch is not a problem if the join operator is a merge join (MJ) or a hash join (HJ). However, with a nested loop join (NLJ) this plan would imply a deep pushdown which would require the search engine to generate two levels of poplets (physical operators to represent the NLJ) in the equivalence classes (Eqc): Eqc(s)/Eqc(t) and in Eqc(s, t). As discussed above, this is problematic in a bottom-up search engine. The solution comes from a tree shape equivalence lemma as follows:

1: If

2: the leaves of a join tree are kept in the same order of tables; and

3: only NLJ is used; and

4: at all levels the deepest possible pushdown of derived columns substitution and of predicate placement is performed

5:

6: then

7: all join tree shapes would give the same overall sequence of open( )/next( )/close( ) on the set of underlying tables, that is all would get the same buffer cache behavior; and 8: hence all have the same cost.

Figure 6B:
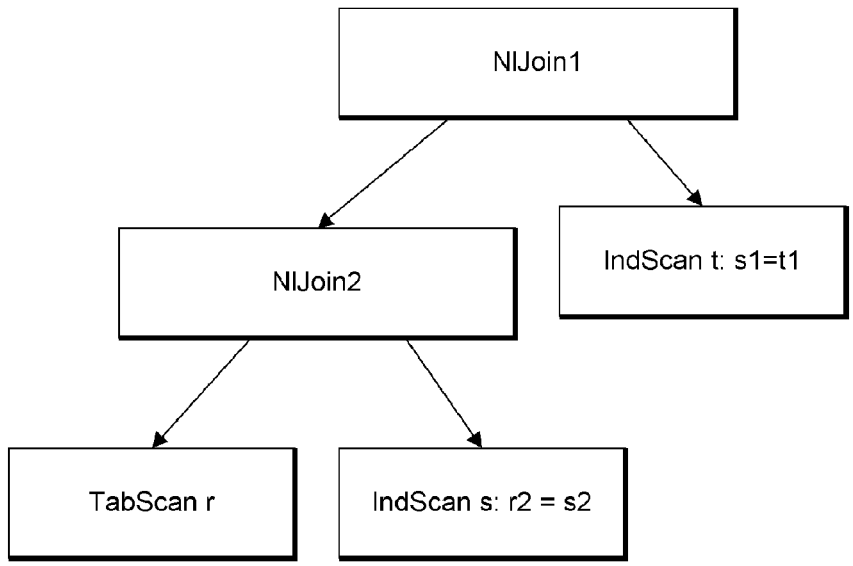
FIG. 6B is a block diagram illustrating a left deep plan for a sample query.
Figure 6C:
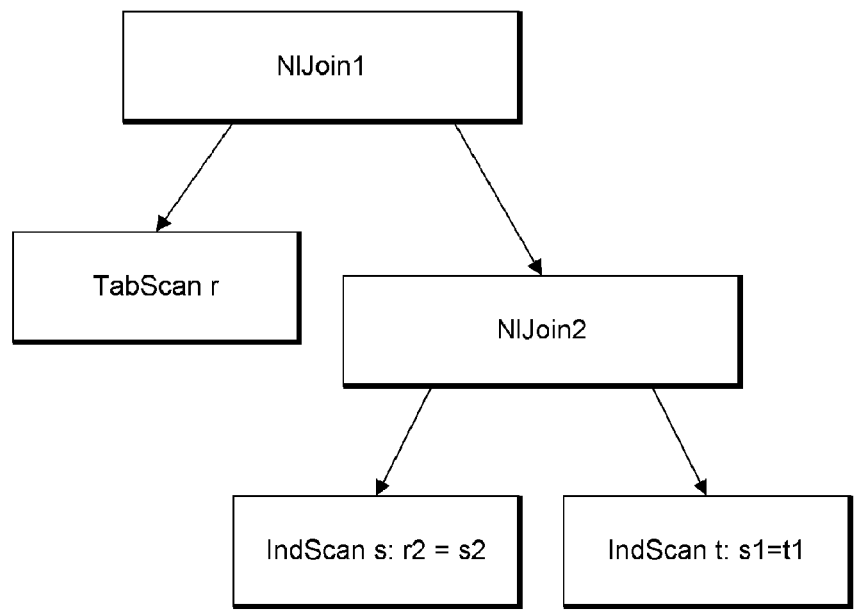
FIG. 6C is block diagram illustrating a right deep tree plan for the sample query of FIG. 6B.

FIG. 6B is a block diagram illustrating a left deep tree plan 620 for the above query. FIG. 6C is block diagram illustrating a right deep tree plan 630 for the same query. A simple explanation for the fact that both tree shapes (i.e., both left deep plan 620 and right deep plan 630) would have the same cost is that for both tree shapes, s is scanned for each tuple in r and t is scanned for each matching tuple in r-s.

To confirm that the two plans have the same cost, consider the behavior of the two plans described above and illustrated at FIGS. 6B-C, the first a left deep tree and the second a right deep tree. Further, assume that each table has two matching tuples under the available clauses (giving a result set of eight tuples). The following is a simulation of the order of open( ), next( ), and close( ) calls (execution trace) for the left deep tree:

```
NLJ1->open
    NLJ2->open
        TabScan r ->open
        TabScan r -> next 1
    NLJ2 -> next 1
        IndScan s -> open 1
        IndScan s -> next 11
    NLJ1 -> next 1
        IndScan t -> open 11
        IndScan t -> next 111
    NLJ1 -> next 2
        IndScan t -> next 112
    NLJ1 -> next 3
        IndScan t -> next 113
            <EOF>
        IndScan t -> close 11
    NLJ2 -> next 2
        IndScan s -> next 12
        IndScan t -> open 12
        IndScan t -> next 121
    NLJ1 -> next 4
        IndScan t -> next 122
    NLJ1 -> next 5
        IndScan t -> next 123
            <EOF>
        IndScan t -> close 12
    NLJ2 -> next 3
        IndScan s -> next 13
            <EOF>
        IndScan s -> close 1
        TabScan r -> next 2
        IndScan s -> open 2
        IndScan s -> next 21
        IndScan t -> open 21
        IndScan t -> next 211
    NLJ1 -> next 6
        IndScan t -> next 212
    NLJ1 -> next 7
        IndScan t -> next 213
            <EOF>
        IndScan t -> close 21
    NLJ2 -> next 4
        IndScan s -> next 22
        IndScan t -> open 22
        IndScan t -> next 221
    NLJ1 -> next 8
        IndScan t -> next 222
    NLJ1 -> next 9
        IndScan t -> next 223
            <EOF>
        IndScan t -> close 22
    NLJ2 -> next 5
        IndScan s -> next 23;
            <EOF>
```

```
            IndScan s -> close 2
        TabScan r -> next 3;
            <EOF>
        TabScan r -> close
            <EOF>
    NLJ2 -> close
<EOF>
NLJ1 -> close
```

The following illustrates the same sequence for the right deep tree:

```
NLJ1-> open
    TabScan r -> open
    TabScan r -> next 1
NLJ1 -> next1
    NLJ2 -> open 1
        IndScan s -> open 1
        IndScan s -> next 11
    NLJ2 -> next 11
        IndScan t -> open 11
        IndScan t -> next 111
NLJ1 -> next 2
    NLJ2 -> next 12
        IndScan t -> next 112
NLJ1 -> next 3
    NLJ2 -> next 13
        IndScan t -> next 113
            <EOF>
        IndScan t -> close 11
        IndScan s -> next 12
        IndScan t -> open 12
        IndScan t -> next 121
NLJ1 -> next 4
    NLJ2 -> next 14
        IndScan t -> next 122
NLJ1 -> next 5
    NLJ2 -> next 15
        IndScan t -> next 123
            <EOF>
        IndScan t -> close 12
        IndScan s -> next 13
            <EOF>
        IndScan s -> close 1
            <EOF>
    NLJ2 -> close 1
    TabScan r -> next 2
    NLJ2 -> open 2
        IndScan s -> open 2
        IndScan s -> next 21
    NLJ2 -> next 21
        IndScan t -> open 21
        IndScan t -> next 211
NLJ1 -> next 6
    NLJ2 -> next 22
        IndScan t -> next 212
NLJ1 -> next 7
    NLJ2 -> next 23
        IndScan t -> next 213
            <EOF>
        IndScan t -> close 21
        IndScan s -> next 22
        IndScan t -> open 22
        IndScan t -> next 221
NLJ1 -> next 8
    NLJ2 -> next 24
        IndScan t -> next 222
NLJ1 -> next 9
    NLJ2 -> next 25
        IndScan t -> next 223
            <EOF>
        IndScan t -> close 22
        IndScan s -> next 23
            <EOF>
        IndScan s -> close 2
```

-continued

```
<EOF>
NLJ2 -> close 2
TabScan r -> next 3
<EOF>
TabScan r -> close
<EOF>
NLJ1 -> close
```

Observe that if the execution traces of the above left deep and right deep trees are traversed in parallel only looking at the lines in bold print above (i.e., only to the leaf level Tab/IndScan→open/next/close), the order of these calls is the same. This demonstrates that the optimizer's search engine can cost the right nested outer joins as NLJ left deep trees. Subsequently, the NLJ left deep trees may transformed into the semantically correct bushy tree shape as the overall cost of the transformed tree remains the same as the cost of the left deep tree. Thus, the methodology of the present invention enables the optimizer search engine to circumvent the prior limitation of only being able to do shallow, one-level deep pushdowns.

Method Steps for Transformation of Left Deep Trees

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Figure 7A:
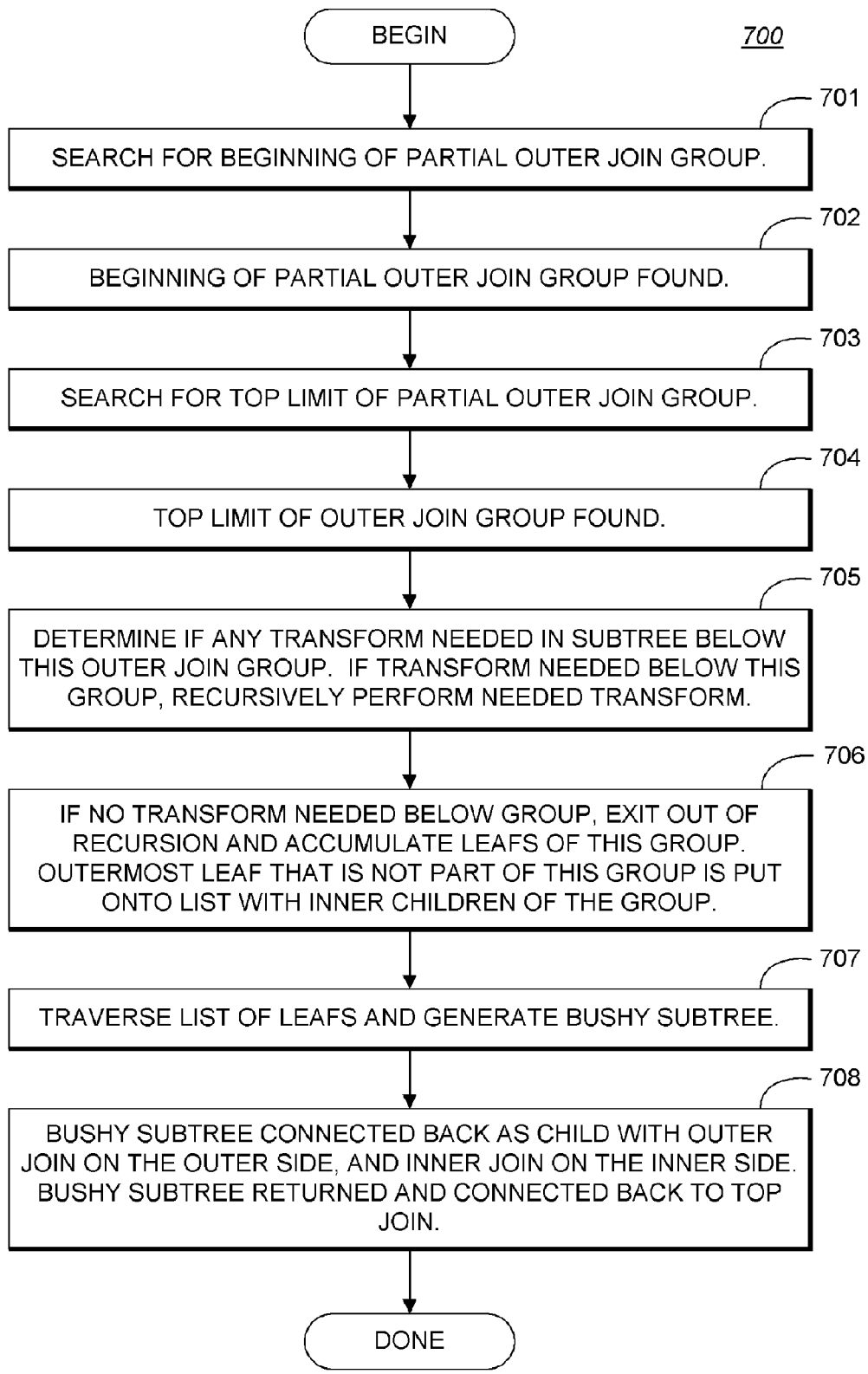
FIG. 7A comprises a flowchart illustrating the method steps of operation of the method of the present invention for performing a deep pushdown transformation.

FIG. 7A comprises a flowchart 700 illustrating the method steps of operation of the method of the present invention for performing a deep pushdown transformation. As described above, the method operates to transform a portion of a plan generated by the optimizer search engine that has an outer join. For purposes of the following discussion, an example of a join involving three tables r, s, and t, with r as the outer table and s and t as the inner tables. This example is used for illustrating the present invention and not for purposes of limitation. Those skilled in the art will appreciate that the present invention can be used with various queries joining a number of tables.

The process starts by searching (checking) for the beginning of a partial outer join group at step 701. The transform of the present invention uses the concept of a partial outer join group. Recall that the search engine has previously generated a left deep tree. When the search engine generates the left deep tree, it puts together at adjacent positions the tables that are in the same outer join group. The search engine does not intersperse these tables with anything else. In this example, the search engine puts inner table s and inner table t next to each other, with r, the outer table, before them.

At step 702, the beginning of a partial outer join group (i.e., the group beginning at leaf t in this example) is found as a result of the check made at step 701. It is known at this point that this is a left deep NLJ subtree, so the traversal of the tree structure continues to search for the top limit of this outer join group at step 703. At step 704, the top limit of the outer join group is found. In this example, table s is the top limit of this outer join group. At step 705, a check is made to determine if any transform is needed in the subtree that is below this outer join group. If a transform were needed below this group, the method would operate recursively to perform the needed transform. Assume in this situation that there is no transform needed below this group.

If no transform is needed below this group, the method exits out of the recursion and accumulates the leaves (leafs) of this group at step 706. The outermost leaf that is not part of this group (e.g., r which is the outer child of the group in this example) is put onto a list with the inner children of the group (e.g., s and t). At step 707, this list of leaves is passed to a method (popGenBushyNIjTree) that builds the bushy subtree by traversing the list of leaves and generating the bushy subtree. At step 708 the bushy subtree that is generated is connected back as the child with r as the outer join on the outer side, and s and t as the inner join on the inner side. This bushy subtree is returned and connected back to the top join.

Figure 7B:
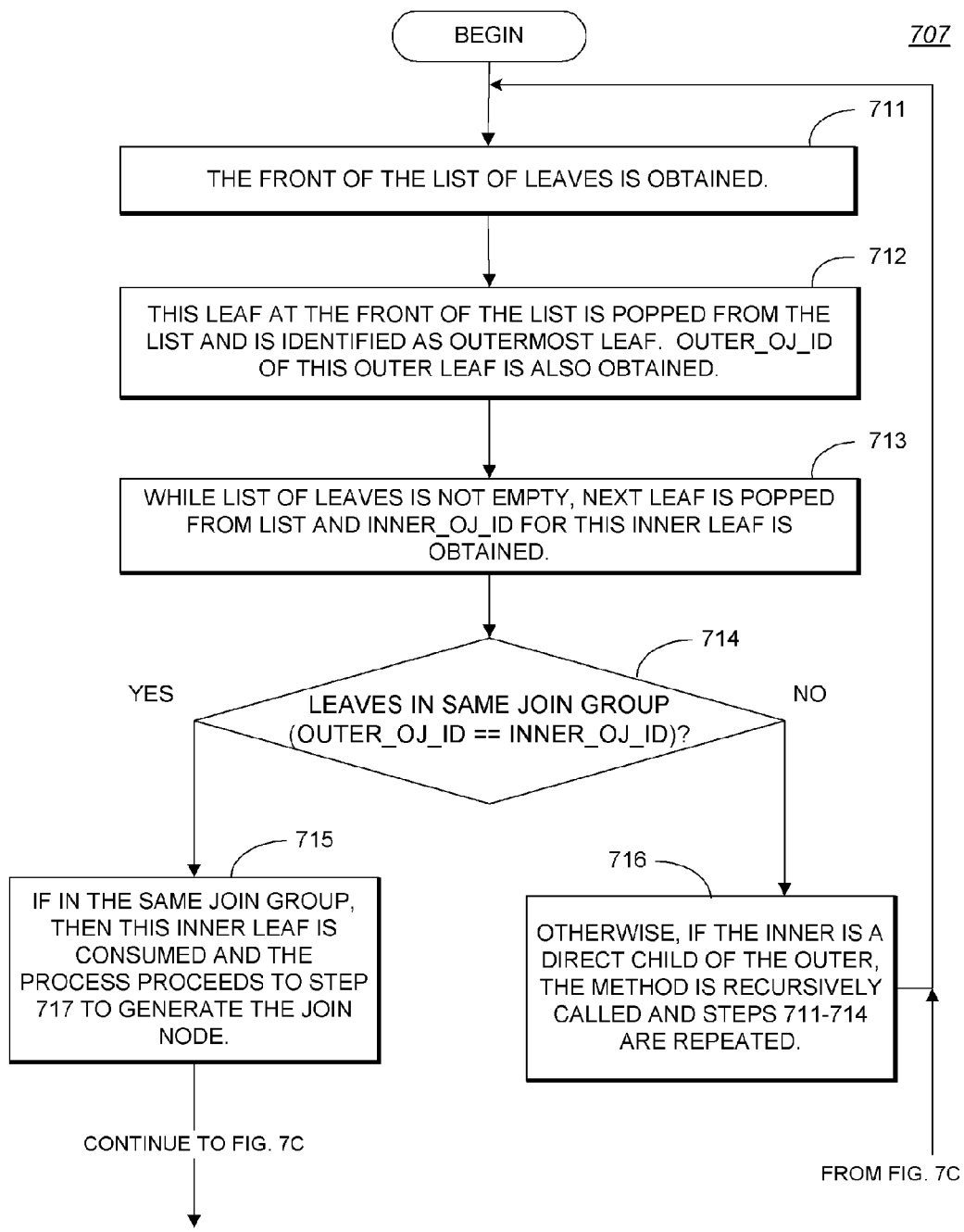
FIGS. 7B-C comprise a single flowchart illustrating the methodology for building a subtree in further detail.
Figure 7C:
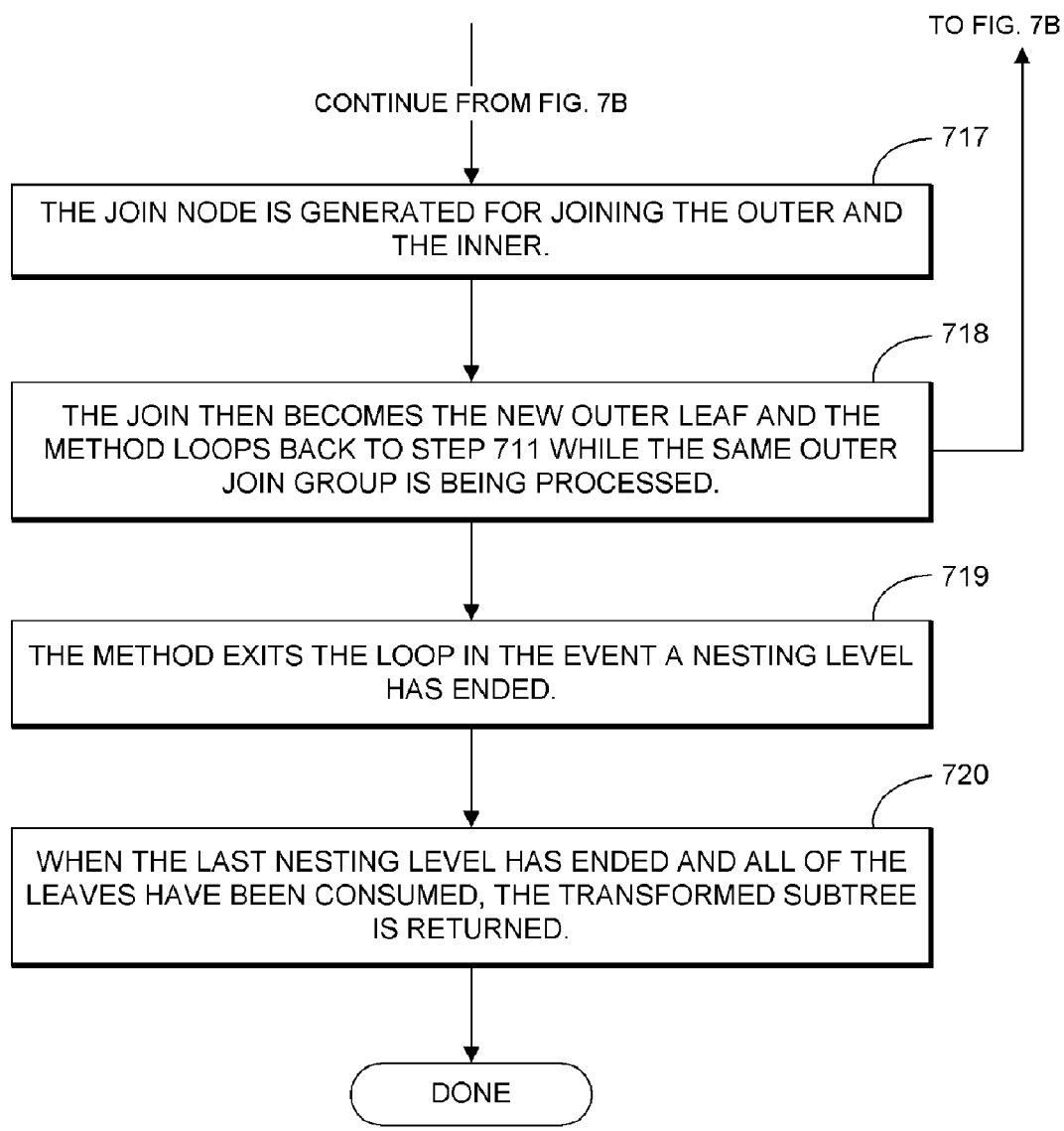

FIGS. 7B-C comprise a single flowchart 707 (corresponding to step 707 of FIG. 7A) illustrating the methodology for building a subtree in further detail. The following discussion will use an example of a join of tables r, s, and t. At the point that the method for generating the bushy subtree is called, the leaves that need to be transformed have been identified and put into a list. The popGenBushyNIjTree method is a recursive function that traverses the list and builds the bushy tree. At step 711, the front of the list of leaves is obtained. The front of the list is the outer node (e.g., leaf r in this example). At step 712, this leaf (leaf r) is popped from the list and is identified as outermost (outer) leaf. At this step the outer join id (outer_oj_id) of this outer leaf is also obtained.

The processing of leaves on the list continues until all of the leaves on the list are consumed. While the list is not empty, the next leaf (e.g., inner leaf s) is obtained at step 713. The inner_oj_id for this inner leaf is also obtained. At step 714, a determination is made as to whether the leaves (e.g., leaf r and leaf s) are in the same join group. If in the same join group (i.e., if outer_oj_id==inner_oj_id), then this inner leaf is consumed at step 715 and the join is done immediately below. Otherwise, if the inner leaf is a direct child of the outer, the method is recursively called to get the actual inner bush at step 716. In this case involving leaf r and leaf s, the leaves do not have the same outer join ids, so steps 713-714 are repeated. Note that after the recursion, the outer leaf (e.g., leaf r) has already been popped from the list, so the recursion handles the inner leaves (leaf s and leaf t). When recursing down into the same popGenBushyNIjTree function for a second time, s is popped off the list as the outer. In this case, the determination at step 714 will be found to be true (outer_oj_id==inner_oj_id) as leaf s and leaf t are peer leaves at the same level. As a result, both leaf s and leaf t are consumed and the method proceeds to step 717.

Otherwise, if the two leaves are not at the same level (at step 714) and the inner leaf is not a direct child of the outer (at step 716), that indicates that a group has been finished. In this example, there are no other leaves in the group (i.e., the list is empty) after leaves r, s, and t have been consumed. (It should be noted, however, that in another case there could be several nested groups and the processing might move from one group to another.)

At step 717, the join node is generated for joining the outer side and the inner side. At step 718, the join then becomes the new outer leaf and the method loops back to step 713 while the same outer join group is being processed. The method exits the loop in the event a nesting level has ended (even though leaves still remain on the list) at step 719. When the last nesting level has ended and all of the leaves have been consumed, the transformed subtree is returned at step 720. The transformed subtree that is returned replaces the semantically incorrect left deep NLJ subplan in its parent.

Figure 8:
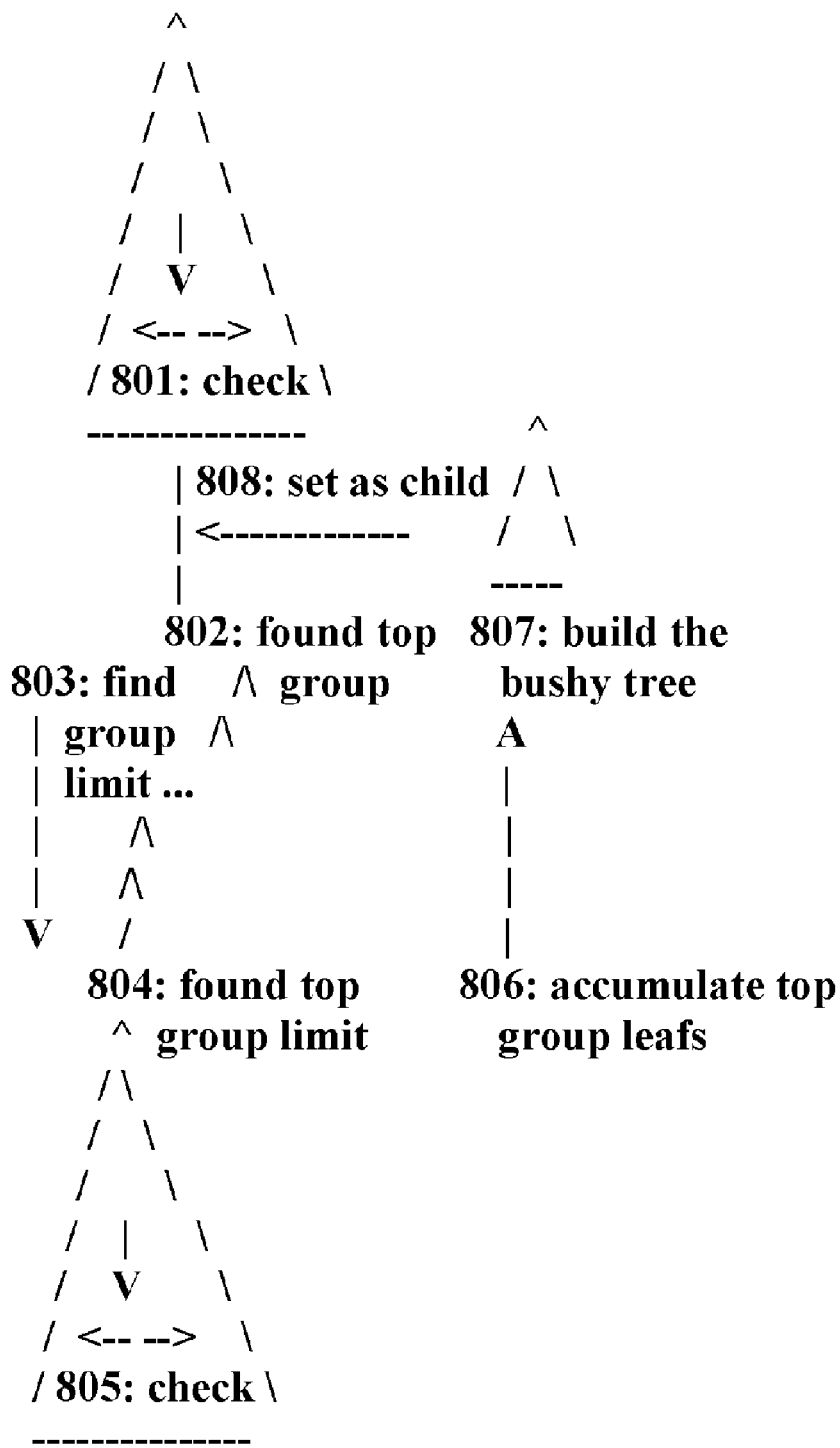
FIG. 8 is a flow diagram providing another illustration of the methodology of the present invention for transforming a left deep subtree into a bushy tree shape.

FIG. 8 is a flow diagram 800 providing another illustration of the methodology of the present invention for transforming a left deep subtree into a bushy tree shape. This flow diagram 800 illustrates the recursive (non-linear) nature of the transformation. As shown at 801 at FIG. 8, a popDeepPdTransform( ) method initially checks for the need of the transform, recursive left/right. At 802, a top group is found and popGenBushyNIjTree( ) is called to generate the semantically correct bushy subtree. This popGenBushyNIjTree( ) method calls popAccumulateBushyNIjLeafs( ) to accumulate in a list the leaves of the left deep NLJ fragment that has the group on its inner side. As 803, the popAccumulateBushyNIjLeafs( ) method recurses down (depth first recursion) on its outer child looking for the limit of the top group. At 804, the limit of this top group is found. At 805, popAccumulateBushyNIjLeafs( ) recurses down (depth first mutual recursion) to popDeepPdTransform( ) to check the outermost leaf for other needed transforms.

As shown at 806 at FIG. 8, once the popDeepPdTransform( ) method returns the possibly transformed outermost leaf, popAccumulateBushyNIjLeafs( ) returns from the recursion accumulating it together with each of the inner leafs of the left deep NLJ fragment in a list. Note that the popDeepPdTransform( ) method does not need to be called on the inner leaves, as the search engine ensures that they contain only the top group's underlying tables. At 807, a popGenBushyNIjTree( ) overloaded sibling method uses the list of leaves to build the semantically correct NLJ bushy tree over the leaves. As shown at 808, this transformed subtree is returned and replaces the semantically incorrect left deep NLJ subplan in its parent.

Transform of Left Deep Tree to Bushy Tree

The process of transformation of a left deep tree will next be described in greater detail. The following OptDeepPdTransform method of the OptBlock module is initially invoked to perform any required transformation of a left deep tree structure generated by the optimizer search engine:

```
854   OptBlock::OptDeepPdTransform( )
855   {
856       if (!OptNeedsDeepPdTransform( ))
857          return;
858
859       EquivClass   *eqc = OptTotalEqc( );
860       PopList      *best_pops = eqc->eqcPops( );
861       PopListIter  pop_pos;
862
863       for (pop_pos = best_pops->begin( );
864            pop_pos != best_pops->end( );
865            ++pop_pos)
866       {
867          PopBase    *pop;
868          pop = *pop_pos;
869
870          // Transform any semantically incorrect left
871          // deep NLJ tree into a same-cost
872          // semantically correct bushy NLJ tree.
873          //
874
875          *pop_pos =
876             pop->popDeepPdTransform( );
877
878       }
879   }
```

As illustrated above at lines 856-857, if the optimizer does not need to perform a deep pushdown transform, then the method does nothing and simply returns. Otherwise, if the transform is necessary, the method enters the loop commencing at line 863. For each pop (physical operator) in the list of best pops (the list of physical operator trees of this query block), the pop position is assigned to the iterator. This is the hook into the optimizer. The physical operator that is assigned deep transforms itself by calling a popDeepPdTransform method for performing the transformation.

In the currently preferred embodiment, the following popDeepPdTransform method checks for the need for the transform (recursing left/right to check for the need for the transform):

```
17561   template <class Cost, class Props>
17562   PopBase *
17563   PopNlJoin<Cost, Props>::popDeepPdTransform( )
17564   {
17565      // the transform always starts on the parent NLJ
17566      // of the topmost partial group NLJ
17567      SYB_ASSERT(!popIsPartialDeepPdGroup( ));
17568
17569      // is the transform needed here?
17570      if (popNeedsDeepPdTransform( ))
17571      {
17572         // then return the transformed tree
17573         //
17574         // Note: the bushy generation recurses
17575         // back to popDeepPdTransform( ) on the
17576         // leafs of the left deep partial group
17577         // NLJ subtree, to catch lower portions
17578         // needing the transform
17579         //
17580         return popGenBushyNIjTree( );
17581      }
17582
17583      // otherwise, simply recurse down left/right
17584      // checking for the need of a transform
17585      //
17586      // Note: we do need to check the inner side, too:
17587      // under a multi-GT StoreInd, there could be a
17588      // left deep NLJ sub-tree to be transformed.
17589      //
17590      // Note: under a NLJ we don't need to check Ob
17591      // limits, as the children of a join are always
17592      // in the same Ob as the join.
17593      //
17594      nodeSetLeft((SamePop *)
   nodeGetLeft( )->popDeepPdTransform( ));
17595      nodeSetRight((SamePop*)
   nodeGetRight( )->popDeepPdTransform( ));
17596
17597      // this NLJ was not transformed
17598      return this;
17599   }
```

At line 17570, a check is made to determine if the transform is needed. If so, then a popGenBushyNIjTree method is called as provided at line 17580 to generate and return the semantically correct bushy subtree. The popGenBushyNIjTree method that is called is as follows:

```
17601   template <class Cost, class Props>
17602   PopBase *
17603   PopNlJoin<Cost, Props>::popGenBushyNIjTree( )
17604   {
17605      PopList leafs;
17606
17607      // we certainly need a transform if we got here
17608      SYB_ASSERT(popNeedsDeepPdTransform( ));
17609
17610      // accumulate the leafs of the left deep NLJ
17611      // tree fragment
17612      popAccumulateBushyNIjLeafs(leafs);
17613
17614      // generate the semantically correct bushy NLJ
17615      // tree over these leafs
```

```
17616        return popGenBushyNIjTree(leafs);
17617    }
```

The above popGenBushyNIjTree method starts with an assertion that a transform is needed as shown at line 17608. As illustrated at line 17612, it calls a popAccumulateBushyNIjLeafs method to accumulate in a list the leaves (leafs) of the left deep NLJ fragment that the group has on its inner side. The popAccumulateBushyNIjLeafs method is described below. After obtaining the list of leaves, an overloaded popGenBushyNIjTree method is called as provided at line 17616 with the list of leaves (leafs). This overloaded method generates the semantically correct bushy NLJ tree over these leaves. The overloaded popGenBushyNIjTree method is also detailed below.

The popAccumulateBushyNIjLeafs routine which is called by the above popGenBushyNIjTree method is as follows:

```
17628    template <class Cost, class Props>
17629    void
17630    PopNlJoin<Cost, Props>::popAccumulateBushyNljLeafs(PopList &leafs)
17631    {
17632        PopBase *outer = nodeGetLeft( ),
17633            *inner = nodeGetRight( );
17634
17635        // while the outer child is a partial group,
17636        // descend into the depth-first recursion
17637        if (outer->popIsPartialDeepPdGroup( ))
17638        {
17639            outer->popAccumulateBushyNljLeafs(leafs);
17640        }
17641        else
17642        {
17643            // we have reached the outer child that is
17644            // not a partial group; we end the recursion,
17645            // this will be the outermost child of the
17646            // bushy NLJ tree
17647
17648            // the outermost child gets first in the list
17649            SYB_ASSERT(leafs.empty( ));
17650
17651            // the outermost leaf could need further
17652            // transforms; the mutual recursion to
17653            // popDeepPdTransform( ) handles that and
17654            // the possibly transformed outermost leaf
17655            // goes the first into the list
17656            leafs.push_back(outer->popDeepPdTransform( ))
17657        }
17658
17659        // within a deep PD transform group, the SE never
17660        // generates an inner child that's itself a partial
17661        // group
17662        SYB_ASSERT(!inner->popIsPartialDeepPdGroup( ));
17663
17664        // on the way out of the recursion, accumulate
17665        // each inner leaf into the list
17666        leafs.push_back(inner);
17667    }
```

While the outer child is a partial group (i.e., within the inner group), the leaf is accumulated as provided at 17637-17640. When the outer child is not a partial group (i.e., not part of the inner group) the else condition at line 17641 is applicable. Using the same example of a join of tables r, s, and t, the outer child r is not a partial group (as it is not within the inner group consisting of s and t). Accordingly, when r is reached the else condition at line 17641 is applicable. At line 17649 an assertion is made that the list of leaves is empty as this is where the routine starts to put leaves into the list.

The popAccumulateBushyNIjLeafs method pushes down (recurses) to popDeepPdTransform to check the outermost leaf (e.g., r) for other needed transforms as provided at line 17656. The outermost leaf could need further transformation as somewhere below it in the tree structure there may be another outer join (e.g., there could be several outer joins in the same query). Once popDeepPdTransform returns the possibly transformed outermost leaf, popAccumulateBushyNIjLeafs( ) returns from the recursion accumulating it together with each of the inner leaves of the left deep NLJ fragment in a list. Note that popDeepPdTransform does not need to be called on the inner leaves (e.g., s and t) as the search engine ensures that they contain only the top group's underlying tables. At line 17662, an assertion is made that the inner leaves are not partial deep groups (i.e., the inner leaves are tables). On the way out of the recursion, the inner leaves are pushed down as provided at line 17666.

This list of leaves that is generated is passed to the following overloaded popGenBushyNIjTree method that traverses the list and builds a semantically correct NLJ bushy tree over the leaves in the list:

```
17669    template <class Cost, class Props>
17670    PopBase *
17671    PopNlJoin<Cost, Props>::popGenBushyNljTree(PopList &leafs)
17672    {
17673        TraceOut    &traceout = ::traceout( );
17674
17675        GcsState    *gcs;
17676        EqcN    *eqc;
17677        PopBase    *outer,
17678            *inner,
17679            *join;
17680        OjIdType    outer_oj_id,
17681            inner_oj_id;
17682
17683        // if we got here, the leafs list can't be empty
17684        SYB_ASSERT(!leafs.empty( ));
17685
17686        // consume the outer leaf
17687        outer = leafs.front( );
17688        leafs.pop_front( );
17689
17690        // get the outer OjId, it's supposed to be the same
17691        // for all leafs within this group
17692        outer_oj_id = outer->popTreeLogProps( )->IpGetPartialOjId( );
17693
17694        // get the GC manager, we need it for
17695        // the OJ parent-child relationship
17696        gcs = outer->getOptBlock( )->OptGetGcs( );
17697
17698        // consume all further leafs that are in the same OJ group
17699        for (; !leafs.empty( );)
17700        {
17701            // peep at the next leaf
17702            inner = leafs.front( );
17703            inner_oj_id = inner->popTreeLogProps( )->IpGetPartialOjId( );
17704
17705        // the inner leaf is certainly part of an OJ group
17706            SYB_ASSERT(inner_oj_id != OJ_NOID);
17707
17708        // what OJ group is the inner in, with respect
17709        // to the current (outer) OJ group?
17710
17711        // same OJ group;
17712            if (outer_oj_id == inner_oj_id)
17713            {
17714            // consume inner, it's a peer leaf
```

-continued

```
17715              leafs.pop_front( );
17716          }
17717          // a direct child OJ group
17718          else if (gcs->GcsIsOjParentChild(outer_oj_id,
inner_oj_id))
17719          {
17720              // inner starts a child OJ group
17721
17722
17723
17724                  // recurse down to get the actual
17725                  // inner bush; all leafs of the inner
17726                  // child (and potential descendants)
17727                  // OJ groups are consumed therein
17728                  //
17729                  inner =
popGenBushyNljTree(leafs);
17730          }
17731          // neither
17732          else
17733          {
17734              // An inner is never a further descendant
17735              // of the outer, if it's not a direct child.
17736              // The reason is that the outer tables of an
17737              // OJ are always adjacent to the beginning
17738              // of the child group. An OJ group and one
17739              // of its sub-groups never start on the same
17740              // leaf, as at least a leaf of the parent OJ
17741              // group will preceed the first leaf of the
17742              // child OJ group.
17743              //
17744              // However, several descendant OJ groups
17745              // can finish on the same leaf and the next
17746              // leaf can be either the ancestor or a
17747              // peer OJ child of the same ancestor.
17748
17749              // In both cases, we don't consume the
17750              // inner leaf here. We return up to the
17751              // recursion level which handles the ancestor
17752              // that is either a peer or a direct parent
17753              // and let it take over.
17754
17755                  return outer;
17756          }
17757
17758          // we do have an outer/inner pair that can be
17759          // joined here
17760
17761          // get the EqcN of this new join
17762          eqc = EqcN::eqcGet(outer->popEqc( ),
inner->popEqc( ));
17763
17764          // let the EqcN generate and setup the join
17765          // (get the LogProps and expand, property
17766          // propagation, costing, etc.)
17767          join = eqc->eqcGenNlJoinPop(outer, inner);
17768
17769          // the transform need is solved for this subtree
17770          SYB_ASSERT(!join->popNeedsDeepPdTransform( ));
17771          // we did NOT create a partial OJ!
17772          SYB_ASSERT(!join->popIsPartialDeepPdGroup( ));
17773
17774          // this join is the new outer leaf
17775          outer = join;
17776
17777          // we are still within the same OJ group
17778          SYB_ASSERT(outer_oj_id ==
17779
outer->popTreeLogProps( )->lpGetPartialOjId( ));
17780      }
17781
17782      // we have exhausted the leafs
17783      return outer;
17784  }
```

The above overloaded popGenBushyNIjTree method performs the actual transformation. At the point that this method is called, the leaves that need to be transformed have been identified and put into a list. This method is a recursive function that traverses the list and builds the bushy tree. As illustrated at line 17687, it initially proceeds to grab the front of the list of leaves (leafs.front( )). The front of the list is the outer node (e.g., leaf r in this example). The method incrementally builds outer and inner portions of the join. As provided at line 17692, it identifies the outermost leaf as the outer and it pops (removes) it from the list. Next, the method gets the outer_join_id of this outer leaf as also shown at line 17692. The for loop commencing at line 17699 provides for processing the leaves on the list until all of them are fully consumed. While the list is not empty, the inner leaf (leafs.front) is obtained as shown at line 17702. The leaf is not yet consumed, because it may not be up to this level to consume it. The inner_oj_id of this inner leaf is then obtained as shown at line 17703. When the method gets to this point, the fact that the inner leaf is within some outer join is known. Thus, an assertion to this effect is made as illustrated at line 17706. Note that the outermost leaf could be top level. For instance, using this same example of r, s, and t, the outermost leaf (r) does not have an id itself because it is a top level leaf.

If in the same join group (i.e., if outer_oj_id is equal to inner_oj_id at line 17712), then this inner leaf is consumed and the join will be done immediately below. Otherwise, if the inner is a direct child of the outer, popGenBushyNIjTree (leafs) is called at line 17729. In this case, the method recurses down to get the actual inner bush. The difference in this case (i.e., after the recursion) is that the outer leaf has already been popped from the list. Referring again to the same example of a list (e.g., with leaves r, s, and t), at this point r has already been popped from the list. Therefore, the recursion handles leaf s and leaf t. When recursing down into the same popGenBushyNIjTree function for a second time, s is popped off the list as the outer. The if condition at line 17712 then checks whether outer_oj_id==inner oj_id. In this case, this condition will be found to be true as leaf s and leaf t will have the same oj_id as peer leaves at the same level. As a result, both leaf s and leaf t will be consumed.

Otherwise, if the two leaves are not at the same level (i.e., the if condition at line 177712 is not satisfied) and the inner leaf is not a child of the outer (i.e., also falls through the else if condition at line 17718), that indicates that a group has been finished. In this event the else condition at line 17732 is applicable. At this point there are no other leaves in the group; the list is empty and all leaves have been consumed. (It should be noted, however, that in another case there could be several nested groups and the processing might move from one group to another.)

At line 177762, the equivalence class that is to contain this new join (outer to inner) is obtained. This new equivalence class is then asked to generate the join node for joining the outer and the inner. The equivalence class that is called is one that knows how to generate this join node. At line 17770 an assertion is made that the transform is not needed (given that a correct bushy subtree has just been built). Another assertion is made as shown at line 17772 that this join is not, itself, a partial deep pushdown group.

The join then becomes the new outer leaf as provided at line 17775 and the method loops after asserting that while remaining in this loop the same outer join group is being processed. The method exits the loop in the event a nesting level has ended (even though leaves still remain on the list) as provided at line 17744. When the last nesting level has ended and all of the leaves have been consumed, the function returns as provided at line 17783. The transformed subtree that is returned replaces the semantically incorrect left deep NLJ subplan in its parent.

The transform of the present invention works for any level and combination of right and left nesting of outer joins. Each time a child group is encountered, the method recurses down a level, builds that group, and then returns it. It is then the responsibility of the function that is recursively called to build the child. It is the responsibility of the parent that called it to use the child that is built.

Semi-Join Transform

Overview of Semi-Join Transform Methodology

The system and methodology of the present invention can be used for a semi-join transform as well as the above-described outer join transform. A semi-join is implemented by a specialized behavior of the join operator: all projection comes from the outer child, the inner child only filters outer rows that have no inner match. The semi-join is a duplicates removal technique which is used for DISTINCT queries and IN/EXISTS subqueries. In prior art systems, such queries are typically implemented with a top delta-project, a leaf level tuple filter, or as a left deep join tree using a magic constant technique to stop the scan of EXISTS tables. There are, however, queries where performance may be improved by selecting a plan using a semi-join which should be bushy for semantic correctness.

The semi-join is one of many techniques that can be used to implement IN and EXISTS subqueries and SELECT DISTINCT statements. The use of the semi-join is not mandatory as one can alternatively obtain the correct duplicate semantics by other means. In other words, there are a number of ways to solve distinctness and the semi-join is only one of them. Distinctness may, for example be obtained by using the primary keys of the tables that do not need to have the duplicates filtered out and then doing a delta project. However, in certain circumstances, it is more efficient to include a semi-join in an access plan while also putting an inner bush inside the semi-join. The semi-join would still be legal (i.e., semantically correct) as a left deep plan without the inner bush, but would require that the access plan include an operator that enforces distinctness above the semi-join in the access plan. The need to add this operator makes the semi-join a much less attractive alternative during search space inspection. The semi-join transform of the present invention enables semi-joins to be used in a larger number of situations so as to obtain better performance in execution of queries needing distinctness enforcement.

The general approach of the present invention for transformation of plans including semi-joins provides for accepting some left deep trees as having distinctness solved during the search space inspection phase of query optimization, even though such left deep trees (or subtrees) do not enforce correct duplicate removal. These trees (subtrees) are then marked as a partial distinct group for transformation so that the distinctness needs of the query are addressed in an efficient and semantically correct manner. The manner in which the subtrees are tagged for transformation is described below in more detail. After the optimizer search engine has generated a best plan (or a plurality of best plan candidates in the case of parallel optimization), a transformation is applied so as to generate the semantically correct bushy tree inside the semi-join. The actual transformation is applied after the search engine has selected a best plan(s) as described above in the discussion of the outer-join transform.

It should be observed that in the case of the above-described outer-join transform, the need for the transform is a logical property that is related to tables in the equivalence class (i.e., the need for transform is something that is known a priori). In contrast, the need for transformation of a semi-join group cannot be based on logical properties as whether or not the transformation is necessary does not depend on just the tables in the equivalence class. Instead, the need for the semi-join transform depends on the actual subplan that is at hand during the search space inspection phase of query optimization when plan fragments (or subplans) are generated. Thus, it is a physical property rather than a logical property as it depends on the particular subplan that is currently being considered and not on the tables that are joined.

Use of Semi-Join to Solve Distinctness Needs of Query

Before describing the methodology of the present invention in more detail, the use of a semi-join in a query execution plan will be briefly described. The following discussion will initially describe when a semi-join can be used without any need for any transformation. The methodology of the present invention for applying a transformation enabling use of a semi-join to solve the distinctness needs of a query in a wider range of situations will then be described. A semi-join is an operator which can be used to solve the distinctness need of a query. Consider, for instance, the following example query:

select * from r where r1 IN (select s1 from s)

The above is a simple example of a query including an IN subquery. Notice that this query includes a join of r and s, but only the tuples of r that comply with the subquery condition are to be returned. The subquery serves to eliminate tuples from r, but does not introduce duplicates. Even if there are several tuples from s that could match the tuple from r, only one tuple from r is returned. A semi-join could be used for the above query as follows: r semi-join s on predicate p. This is equivalent to the delta project on the columns of r of the join of r and s on the same predicate p. The delta project relies on the fact that a table has a unique key. If a table does not have a unique key, then the RID is used as the unique key. As the table r has a unique key (or at least the RID) the delta project on the columns of r would not eliminate any duplicate of r. However, as no column of s is in the delta project, no duplicate comes from s. As there is a join between r and s (on the predicate p) the tuples in r that do not match the predicate would not be present (included in the result).

A semi-join can be placed in an access plan subject to the following general conditions. First, the outer child of the semi-join should not have any distinctness needs. In other words, any duplicates of the outer child are acceptable as such, because a semi-join would only be able to avoid the generation of wrong duplicates on the inner side. Second, the inner side should have only distinct tables, meaning that on the inner side of the semi-join there are only tables that come from an IN/EXISTS subquery or from a SELECT DISTINCT view. The third condition is that all of the projection should come from the outer side of the semi-join. This may be illustrated by example. The following discussion will refer again to the following example query:

select * from r where r1 IN (select s1 from s)

The predicate p is (r1=s1) in this example. The outer table is r. The inner table is s. To get the correct results of this query, one can simply perform the join of r and s and then put over it a distinct sorting (or a distinct hashing) only on the columns of r. Alternatively, one could also have r as the outer table, a semi-join on the clause p, and s on the inner side.

The advantage of using the semi-join in this case is that it has a straightforward implementation that provides good performance. For instance, when the join operator is a NLJ, the implementation takes an outer tuple (e.g., from r) and does the scan on the inner side (e.g., on s). If there is no match on the inner side, the outer tuple is discarded. However, if there is a match on the inner side (r1=s1), the tuple is returned and the search for additional matching tuples on the inner side is terminated as there is no need to look for a second match on the inner side. This provides a straightforward and very inexpensive implementation of needed duplicate semantics. The semi-join is a cheaper alternative than scanning every tuple on the inner side (e.g., in s) and then using another operator (e.g., distinct sorting or distinct hashing) to remove the duplicates.

As discussed above, to be able to use a semi-join to solve a need for distinctness, the outer side of the semi-join should not need distinctness resolution. In the above example, this is the case as r is not a table that is included in the subquery. Another requirement is that the inner table(s) should be all distinct tables. This is also the case in this example as the only inner table is table s and it comes from the subquery. Lastly, the projection of the result of the join should come exclusively from the outer child. This is also true in this example because the query is selecting tuples from table r.

There are, however, also queries in which the use of a semi-join is not legal (semantically correct). For instance, consider the following example view:

Create view VD (VD1, VD2) as SELECT DISTINCT s1, s2, from s

In the above view, VD projects the columns VD1, VD2. Now, assume that a query using the above view is as follows:

select r1, VD1 from r, VD, where r2=VD2

If one tries to use a semi-join between r and s, which are the underlying tables of the view in this case, it is not possible to do so in the manner described above. The r that is the outer side of the semi-join has no distinctness need. Also, the s that is on the inner side of the semi-join is the only table on the inner side. S is below a select distinct and needs distinctness. However, the projection is problematic because the query wants to select VD1. What this means is that during the scan on the inner side, the scan cannot simply stop when the first matching tuple (s2=VD2) is found. Instead, there could be several tuples in table s which have different values of VD1. As the query requests return of these different values of VD1, the scan on the inner side should continue until all matching tuples are obtained. This example illustrates that projection inclusion is important as incorrect results may be generated if a semi-join were to be used without respecting the condition that all of the projection should come from the outer side of the semi-join.

Example of Semi-Join Transform of a Sample Query

The above examples illustrate simple cases involving two tables in which a semi-join may (or may not) be used given the semantics of a given query. The methodology of the present invention will now be described using the following example of a query which includes several tables in a subquery:

select * from r where r1 IN (select s1 from s, t, u, v where s2=t1, t2=u1, u2=v1)

Figure 9A:
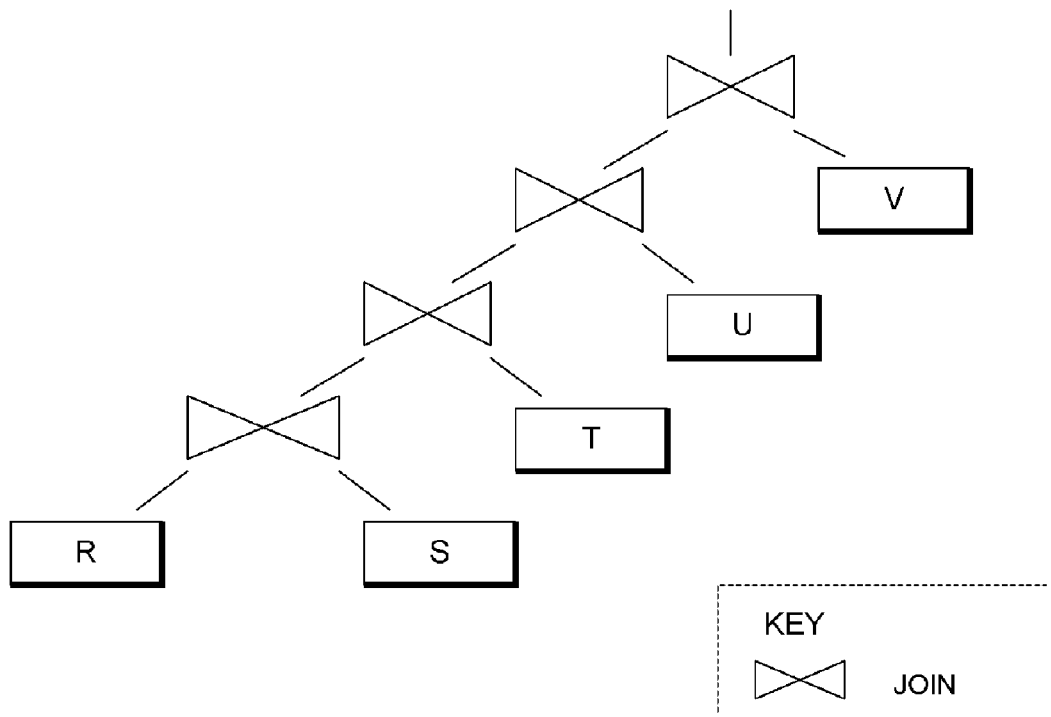
FIG. 9A is a diagram of a left deep nested loop join (NLJ) tree generated by the optimizer based on the above query.

FIG. 9A is a diagram of a left deep nested loop join (NLJ) tree generated by the optimizer based on the above query. As described above, during search space inspection, the optimizer generates only left deep NLJ trees so as to reduce the complexity of the search space. The initial question to be discussed is whether a semi-join may be placed between r and s in the left deep NLJ tree shown at FIG. 9A. This requires examining the conditions described above. The outermost table (table r) does not require distinctness resolution, so this is not a problem. Also, the inner table s is distinct (from the subquery) so this condition is also satisfied. The problem is that the projection condition does not hold as columns other than those from the outer side (table r) are to be projected. Although s1 does not really need to be projected, it is necessary to project s2 because it is needed in the join with table t. So at this point, a semi-join may not be placed between r and s in the left deep tree. For similar reasons, a semi-join cannot be placed between s and t or between t and u.

However, it would be permissible (legal) to place a semi-join between table u and table v because nothing is projected from table v. Doing so, however, would not solve distinctness needs of the query as the outer child already has duplicates. Putting a semi-join here would not eliminate the duplicates coming from s, t, and u. As a result, adding a semi-join between u and v would not usually be useful as it would still be necessary to include a distinctness enforcer above this left deep subtree in the query plan.

Figure 9B:
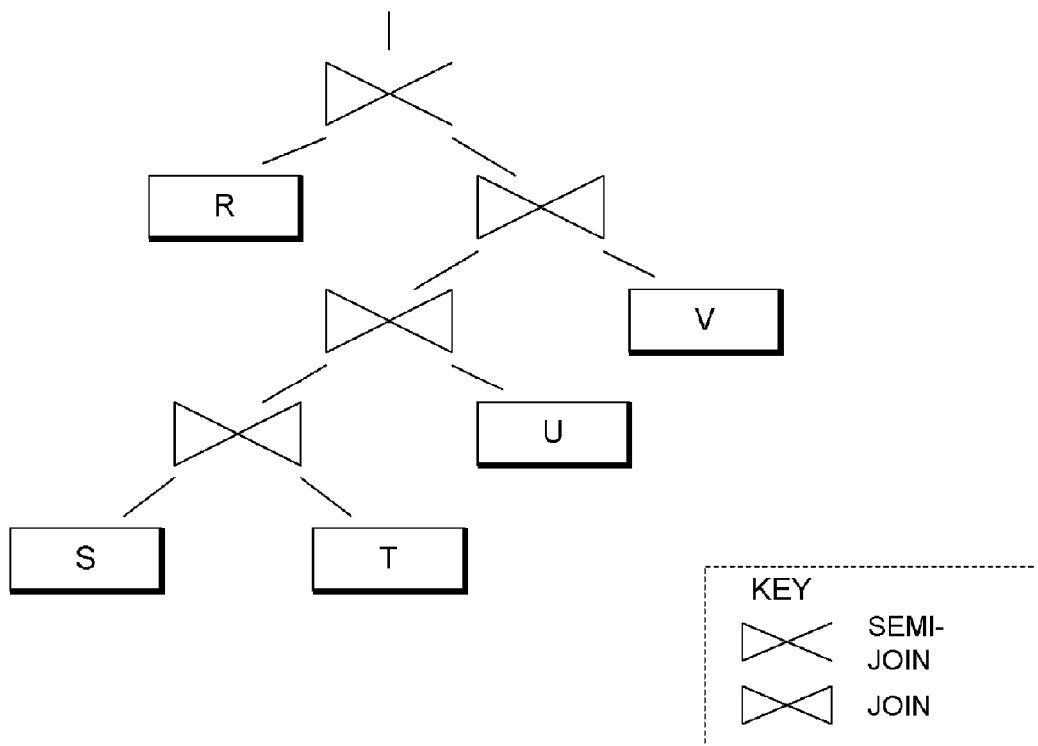
FIG. 9B is a diagram illustrating a query plan structure having a semi-join with only r on the outer side and a left deep tree including s, t, u, v on the inner side of the semi-join.

The present invention provides a more elegant and efficient solution to this problem. FIG. 9B is a diagram illustrating a query plan structure having a semi-join with only r on the outer side and a left deep tree including s, t, u, v on the inner side of the semi-join. As shown at FIG. 9B, this query tree has a left deep subtree with s outermost and t, u, and v inside. The use of the semi-join as illustrated at FIG. 9B correctly complies with the above-described conditions. The semi-join has just one table r on the outer side which does not require distinctness resolution. On the inner side it has four tables s, t, u, v. All of these tables are distinct tables as all of them are in the subquery. Also, only r1 of table r needs to be projected, so the condition that all of the projection must come from the outer side also holds true. Thus, the methodology of the present invention which enables the left deep tree generated by the optimizer search engine to be transformed into the required bushy tree shape enables the semi-join to be used in this instance.

Figure 10:
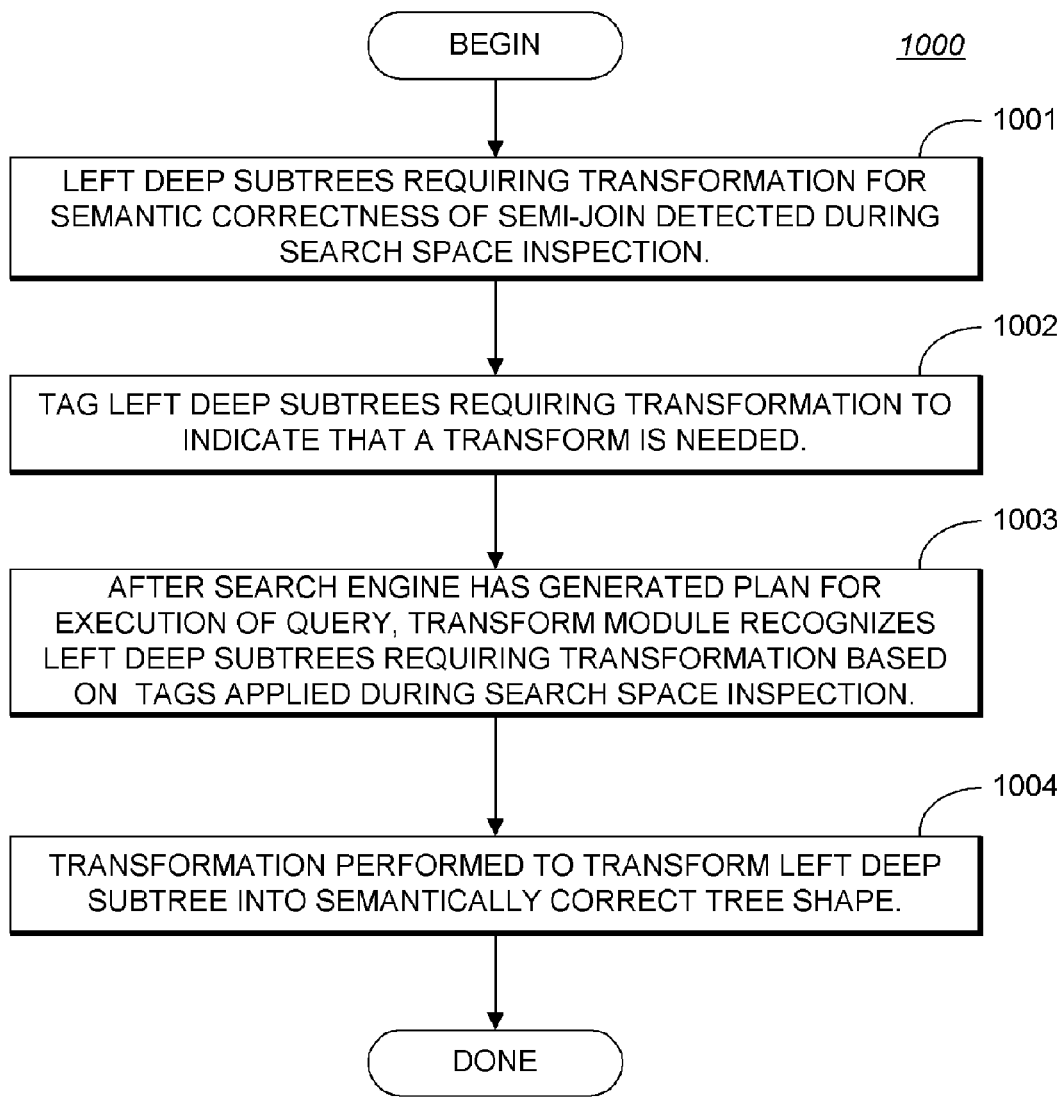
FIG. 10 is a high-level flowchart illustrating the approach of the present invention for performing a semi-join transformation.

FIG. 10 is a high-level flowchart 1000 illustrating the approach of the present invention for performing a semi-join transformation. As previously described, the optimizer search engine only generates left deep trees so as to reduce the complexity of the search space and improve performance. The methodology for performing the semi-join transform commences during the search space inspection phase of query optimization with the detection of the need for the semi-join transformation of a given subplan. At step 1001, left deep subtree(s) (e.g., r, s, t, u, v in the above example) requiring transformation into a bushy tree shape for semantic correctness of a semi-join are detected during search space inspection. At step 1002, these left deep subtree(s) are tagged as semi-join groups (or distinct partial groups) in a specific manner to indicate that a transform is needed to generate a semantically correct semi-join tree structure (as hereinafter described).

After the search engine has generated a best plan for execution of the query, the transform module of the present invention examines the plan generated by the search engine and performs any needed transformation. At step 1003, the transform module recognizes these semi-join (distinct partial) groups (i.e., the left deep subtree(s)) based on the tags that are applied during search space inspection. These distinct partial groups are recognized in a manner similar to that described above for determining outer join groups requiring transformation to a bushy tree shape. At step 1004, the actual transformation is performed to transform the left deep subtree(s) group into the desired, semantically correct bushy tree shape.

Detection of Subtrees Needing Semi-Join Transform

The process for detecting and marking portions of the left deep tree (subtrees) requiring transformation during the search space inspection phase of query optimization will next be described in more detail. For purposes of the following discussion, the same example of a left deep tree including tables r, s, t, u, v as shown at FIG. 9A will be used. On the join that is between r and s on this left deep tree, the outer child (r) does not need distinctness resolution and the inner child has only distinct tables as previously described. Accordingly, this is flagged as a distinct partial group. The flag indicates that some parent may (or may not) be able to complete this distinct partial group (and the thus formed distinct partial group can be subject to the semi-join transform as hereinafter described). The join between r and s (which it should be noted is not a semi-join) is flagged as indicating a distinct partial group. In the currently preferred embodiment, the join is flagged as using the notation "Dp" to indicate a distinct partial group.

Next, when proceeding to the join between table s and table t as illustrated at FIG. 9A, it can be observed that the outer child is the prefix of a partial group and that the inner child t is only within the subquery. However, the projection condition does not hold. Accordingly, the join that is over table t is also flagged as Dp (i.e., a part of a distinct partial group). The join between t and u is also flagged in a similar fashion. Note that the flag that is set is a property of the join and not of the leaves. When moving to v, it can be determined that the outer child is part of distinct partial group (Dp) and the inner child v is a distinct table from the subquery. The system also determines that the projection of this top most join comes only from the outermost non-distinct table (table r). Accordingly, this is tagged (e.g., with a "Dt" tag) to indicate that a distinct transform of this partial group is needed. Note that a NLJ that is tagged as Dp (i.e., part of a distinct partial group) is also tagged as needing distinctness to be solved. The Dp tag indicates that it is potentially part of a complete group, but one that needs to have distinctness solved above it in the plan. The Dt tag indicates that this need for distinctness is solved. During search space inspection, distinctness is not yet really solved (as the transform is needed), but the tag indicates that it has been determined that the transform can be applied in order to solve the distinctness semantics of the query.

The methodology of the present invention provides for tagging the intermediate nodes as needing distinctness to be solved, as during search space inspection a given node is shared by various parents. For example, a given node may be shared by a merge join parent, a hash join parent, and a NLJ parent which are competing to be included as part of the best plan. The search engine of the optimizer of the currently preferred embodiment creates a plan cache that is a DAG (directed acyclic graph) which includes subplans or plan fragments which can have several possible parents. When the search space inspection has been completed and a best plan selected, a tree structure is output by the search engine. However, during search space inspection, a child could be shared by various parents which are competing for inclusion in the final plan. One of these alternatives may require a semi-join transform. However, when the node is below another parent (e.g., a hash join or merge join), the distinct transform may not be necessary (or legal). This illustrates why the semi-join transform cannot rely on logical properties as all of these alternative join strategies (hash join, merge join, and nested loop join) would share the same logical properties being part of the same equivalence class. Instead, the need for the semi-join transform is based on physical properties which depend on the actual plan (or subplan) that is at hand.

Once the search engine generates a best plan (a single best plan assuming a serial, rather than a parallel optimizer), the best plan (tree) that is generated may (or may not) include nodes that are tagged to indicate distinct partial groups (Dp) and/or the need for a transform (Dt). For instance, a given plan may include one or more nodes tagged with Dp but may not include any node tagged with Dt. In this event, the Dp tags are ignored (i.e., as an aborted attempt to have a partial distinct group that needs to be transformed). In this case, the plan would have actually selected another manner for solving distinctness (e.g., distinct hashing, distinct sorting, or the like). However, if the search engine selects a plan such as the one described above (having r, s, t, u, v) with several nodes tagged with Dp (to indicate they are part of a distinct partial group) and a Dt on top to indicate the need for the transform, then the transform would be performed. When the deep pushdown transform is being performed, the transformation is made so that the plan would have r as the outer child and s, t, u, v as the inner bush as illustrated at FIG. 9B. In the currently preferred embodiment, the transform module looks for both outer join partial groups and distinct partial groups. When the leaves are accumulated, the transform module looks for both of these types of groups which may exist in various combinations. For instance, semi-joins can be nested in outer joins which are nested in semi-joins and so on and so forth.

As the set of leaves is accumulated, the transform is performed in the same fashion described above for outer joins. However, in this case the transform method is revised to include an additional reason to get into recursion. In the case of outer join transforms (only), the reason to go into recursion is the detection of an outer join group. Now, the detection of a semi-join group is an additional reason to get into recursion for building the needed bushy tree structure. The transform itself is substantively the same as that described above for outer joins, although there are some minor changes in the code that implements the transform. For example, the flagging of the groups is different as the outer join id is on leaves while the property indicating a partial distinct group is associated with the joins above the leaves. As a result, when the leaves are accumulated another flag (distinct group begin and distinct group end) are added on the leaves as the leaves needing to be transformed are accumulated. When the flag indicating a transform is needed (Dt) is hit, the distinct partial group being created is added and when reaching the end of the Dp, the end of the distinct group is marked. For example, the group in this example is flagged to indicate that it starts on s and ends on v.

Using this same example, when the transform processing of this accumulated list of leaves is actually performed, leaf r is not tagged. After moving to leaf s, the beginning of a distinct partial group is detected and the transform method goes down into recursion to build the required tree shape. Going down into recursion, leafs s, t, u, and v are built by joining them in a left deep subtree. After joining leaf v, the end of the distinct group is detected and the transform method returns from the recursion. The top level of the recursion that handled r then receives the inner bush that was created and joins it using a semi-join. A basic semi-join can be used at this point. The equivalence class method knows how to place a semi-join (e.g., as described in the first simple example involving only tables r and s) generates and places the semi-join in the plan. Note that the resulting structure that is built would have the required distinctness semantics. In this case the outer side is table r with no distinctness resolution needed. Also, the inner side has only distinct tables (s, t, u, v). The last condition is also satisfied as only r1 is projected out from the outer side of the semi-join. Accordingly, the semi-join may correctly be used to solve the distinctness requirements of this query.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. An improved method for optimization of a query requesting data from a database, the method executed by a processor comprising:
   generating a search space comprising only left deep nested loop join trees for returning data requested by the query;
   traversing the search space to select an optimal left deep nested loop join tree for execution of the query;
   after selection of an optimal left deep nested loop join tree including one or more outer joins and/or one or more semi-joins, transforming the selected left deep nested loop join tree into a semantically correct bushy tree structure for returning data requested by the query; and
   building a query execution plan for returning data requested by the query based on the semantically correct bushy tree structure.

2. The method of claim 1, wherein said transforming step includes determining a portion of the left deep nested loop join tree requiring transformation into a bushy tree shape for generating a semantically correct query execution plan.

3. The method of claim 2, wherein said transforming step includes transforming said portion of the left deep nested loop join tree into a bushy tree shape.

4. The method of claim 2, wherein said portion of the left deep nested loop join tree requiring transformation includes a left deep nested loop join subtree.

5. The method of claim 2, wherein said portion of the left deep nested loop join tree requiring transformation includes a left deep semi-join subtree.

6. The method of claim 2, wherein said portion of the left deep nested loop join tree requiring transformation includes an outer join.

7. The method of claim 1, wherein said generating step includes substeps of:
   generating subplans structured as left deep nested loop join subtrees for obtaining data requested by the query;
   grouping said subplans into classes based on tables covered by each subplan; and for each class, selecting a particular subplan having favorable execution costs.

8. The method of claim 7, wherein said generating step further comprises:
   generating a left deep nested loop join tree based on combining particular subplans covering all tables from which the query requests data.

9. The method of claim 1, further comprising: converting the query into a tree of logical operators.

10. The method of claim 9, wherein said generating step includes generating a left deep nested loop join tree comprising a tree of physical operators corresponding to the tree of logical operators.

11. The method of claim 9, wherein said generating step includes marking portions of the left deep nested loop join tree which require transformation to generate a semantically correct query execution plan equivalent to the tree of logical operators.

12. The method of claim 1, wherein said generating step includes identifying portions of the left deep nested loop join tree requiring transformation.

13. The method of claim 12, wherein said transforming step includes transforming identified portions of the left deep nested loop join tree.

14. A computer-readable storage medium having processor-executable instructions for performing a method for optimization of a query requesting data from a database, the method executed by a processor comprising:
   generating a search space comprising only left deep nested loop join trees for returning data requested by the query;
   traversing the tree search space to select an optimal left deep nested loop join tree for execution of the query;
   after selection of an optimal left deep nested loop join tree including one or more outer joins and/or one or more semi-joins, transforming the selected left deep nested loop join tree into a semantically correct bushy tree structure for returning data requested by the query; and
   building a query execution plan for returning data requested by the query based on the semantically correct bushy tree structure.

15. A system for optimization of a query requesting data from a database, the system comprising:
   a computer having a processor and memory;
   a search engine for generating a search space comprising only left deep nested loop join trees for returning data requested by the query and traversing the search space to select an optimal left deep nested loop join tree for execution of the query;
   a transform module for transforming the left deep nested loop join tree selected by the search engine and including one or more outer joins and/or one or more semi-joins into a semantically correct bushy tree structure; and
   a generator module for generating a query execution plan for returning data requested by the query based on the semantically correct bushy tree structure.

16. The system of claim 15, wherein the transform module identifies a portion of the left deep nested loop join tree requiring transformation into a bushy tree shape for generating a semantically correct query execution plan.

17. The system of claim 16, wherein the transform module transforms said portion of the left deep nested loop join tree into a bushy tree shape.

18. The system of claim 16, wherein said portion of the left deep nested loop join tree requiring transformation includes a left deep nested loop join subtree.

19. The system of claim 16, wherein said portion of the left deep nested loop join tree requiring transformation includes a left deep semi-join subtree.

20. The system of claim 16, wherein said portion of the left deep nested loop join tree requiring transformation includes an outer join.

21. The system of claim 15, wherein the search engine generates subplans structured as left deep nested loop join subtrees for obtaining data requested by the query.

22. The system of claim 21, wherein the search engine groups said subplans into classes based on tables covered by each subplan.

23. The system of claim 22, wherein the search engine builds a left deep nested loop join tree based on selecting a subplan having favorable execution costs from each class.

24. The system of claim 22, wherein the search engine builds a left deep nested loop join tree by combining subplans covering all tables from which the query requests data.

25. The system of claim 15, further comprising:
a module for converting the query into a tree of logical operators.

26. The system of claim 25, wherein the search engine generates a left deep nested loop join tree comprising a tree of physical operators corresponding to the tree of logical operators.

27. The system of claim 25, wherein the search engine identifies portions of the left deep nested loop join tree which require transformation to generate a semantically correct query execution plan equivalent to the tree of logical operators.

28. The system of claim 27, wherein the transform module transforms identified portions of the left deep nested loop join tree.

29. In a database system, a method for optimization of a query, the method executed by a processor comprising:
generating a search space comprising only left deep nested loop join subtree candidate subplans for executing the query;
building a plan for executing the query in the search space based on selecting candidate subplans having favorable execution costs;
after a plan has been built, determining whether any left deep nested loop join subtree of the plan should be transformed to a semantically correct bushy tree shape;
creating a transformed plan by transforming any left deep nested loop join subtrees determined to need transformation to a semantically correct bushy tree shape; and
constructing a query execution plan for executing the query based on the transformed plan.

30. The method of claim 29, wherein said generating step includes grouping said candidate subplans into classes based on tables covered by each candidate subplan and selecting a particular subplan in each class having lowest execution costs.

31. The method of claim 30, wherein said building step includes building a plan based on combining particular subplans covering all tables from which the query requests data.

32. The method of claim 30, wherein said building step includes building a left deep nested loop join tree comprising a tree of physical operators.

33. The method of claim 29, wherein said building step includes marking a left deep nested loop subtree requiring transformation to generate a semantically correct query execution plan.

34. The method of claim 33, wherein said determining step includes determining whether a left deep nested loop subtree should be transformed based on the marking.

35. The method of claim 29, wherein said determining step includes determining whether a left deep nested loop join subtree of the plan requires transformation to generate a semantically correct query execution plan.

36. The method of claim 29, wherein said creating step includes accumulating leaves of the left deep nested loop subtree to be transformed.

37. The method of claim 36, wherein said creating step includes generating join nodes for joining said leaves.

38. A computer-readable storage medium having processor-executable instructions for performing a method for optimization of a query, the method executed by a processor comprising:
generating a search space comprising only left deep nested loop join subtree candidate subplans for executing the query;
building a plan for executing the query in the search space based on selecting candidate subplans having favorable execution costs;
after a plan has been built, determining whether any left deep nested loop join subtree of the plan should be transformed to a semantically correct bushy tree shape;
creating a transformed plan by transforming any left deep nested loop join subtrees determined to need transformation to a semantically correct bushy tree shape; and
constructing a query execution plan for executing the query based on the transformed plan.

39. A system for optimization of a query requesting data from a database, the system comprising:
a computer having a processor and memory;
a search engine for generating a search comprising only left deep operators trees and traversing the search space to select an optimal left deep operator tree plan for returning data requested by the query;
a transform module for transforming the left deep operator tree selected by the search engine and including one or more outer joins and/or one or more semi-joins into a semantically correct bushy tree structure; and
a code generator for generating a query execution plan for returning data requested by the query based on the semantically correct bushy tree structure.

40. The system of claim 39, wherein the transform module transforms a left deep nested loop join subtree into a bushy subtree.

41. The system of claim 39, wherein the transform module transforms a left deep semi-join subtree into a bushy subtree.

42. The system of claim 39, wherein the transform module identifies a portion of the left deep operator tree requiring transformation into a bushy tree structure for generating a semantically correct query execution plan.

43. The system of claim 42, wherein the transform module transforms said portion of the left deep operator tree into a bushy tree shape.

44. The system of claim 42, wherein said portion of the left deep operator tree requiring transformation includes a nested loop join subtree.

45. The system of claim 42, wherein said portion of the left deep operator tree requiring transformation includes a semi-join subtree.

46. The system of claim 39, wherein the search engine generates subplans structured as left deep operator subtrees for obtaining data requested by the query.

47. The system of claim 46, wherein the search engine groups said subplans into classes based on tables covered by each subplan.

48. The system of claim 47, wherein the search engine builds a left deep operator tree based on selecting a subplan having favorable execution costs from each class.

49. The system of claim 47, wherein the search engine builds a left deep operator tree by combining subplans covering all tables from which the query requests data.

50. The system of claim 39, wherein the search engine marks portions of the left deep operator tree which require transformation to generate a semantically correct query execution plan.

51. The system of claim 39, wherein said transform module determines leaves of the left deep operator tree to be affected by transformation of the left deep operator tree.

52. The system of claim 51, wherein said transform module generates join nodes for joining said leaves.

* * * * *